US005767865A

United States Patent [19]
Inoue et al.

[11] Patent Number: 5,767,865
[45] Date of Patent: Jun. 16, 1998

[54] SEMICONDUCTOR INTEGRATED CIRCUIT DEVICE ALLOWING FAST REWRITING OF IMAGE DATA AND IMAGE DATA PROCESSING SYSTEM USING THE SAME

[75] Inventors: Kazunari Inoue; Hideto Matsuoka, both of Hyogo, Japan

[73] Assignee: Mitsubishi Denki Kabushiki Kaisha, Tokyo, Japan

[21] Appl. No.: 409,778

[22] Filed: Mar. 24, 1995

[30] Foreign Application Priority Data

Mar. 31, 1994 [JP] Japan .................... 6-062442
Jul. 22, 1994 [JP] Japan .................... 6-170748

[51] Int. Cl.$^6$ .................................... G06F 15/76
[52] U.S. Cl. ................ 345/519; 345/511; 345/517
[58] Field of Search .................. 395/501, 508,
395/511, 517, 519, 122, 131, 445, 458;
345/185, 186, 189, 191, 201, 213, 501,
517, 508, 511, 519, 422, 431; 711/118,
131

[56] References Cited

U.S. PATENT DOCUMENTS

| | | | |
|---|---|---|---|
| 4,951,232 | 8/1990 | Hannah | 395/122 |
| 4,961,153 | 10/1990 | Fredrickson et al. | 395/122 |
| 5,517,603 | 5/1996 | Kelley et al. | 395/126 |
| 5,543,824 | 8/1996 | Priem et al. | 345/201 |
| 5,544,306 | 8/1996 | Deering et al. | 395/164 |
| 5,572,655 | 11/1996 | Tuljapurkar et al. | 345/189 |

FOREIGN PATENT DOCUMENTS

| | | | |
|---|---|---|---|
| 4-225481 | 8/1992 | Japan | G06F 15/72 |
| 5-257459 | 10/1993 | Japan | G06F 15/72 |
| 90/02990 | 3/1990 | WIPO | G06F 1/04 |

OTHER PUBLICATIONS

Application of Multi-port VRAM, IC Application Note, Hitachi, 1986, pp. 15–37.
"Samsung Proposes A Dual Port 1 Mbyte Frame Buffer", JEDEC May 19, 1993, Samsung Proposal.

*Primary Examiner*—Kee M. Tung
*Attorney, Agent, or Firm*—McDermott, Will & Emery

[57] ABSTRACT

Two frame buffer memories are used. Depth coordinates are stored in a data bank memory of the first frame buffer memory. A comparing unit makes comparison between the depth coordinate of an image data currently displayed and the newly input depth coordinate, and thereby outputs a comparison result signal from a comparison result signal output terminal. In the second frame buffer memory, color data is stored in a data bank memory, and the comparison result signal sent from the first frame buffer memory is input via a comparison result signal input terminal. An image processing unit performs blending processing on the color data in response to the comparison result signal, and rewrites the color data.

23 Claims, 27 Drawing Sheets

FIG. 17

| | M | | | |
|---|---|---|---|---|
| | m | m | | m |
| BL1,MA1,WL1 | BL2,MA1,WL1 | - - - - | BLy,MA1,WL1 | ⎫ |
| BL1,MA2,WL1 | BL2,MA2,WL1 | - - - - | BLy,MA2,WL1 | ⎬ n |
| ⋮ | ⋮ | ⋮ | ⋮ | |
| BL1,MAn,WL1 | BL2,MAn,WL1 | - - - - | BLy,MAn,WL1 | ⎭ |
| BL1,MA1,WL2 | BL2,MA1,WL2 | - - - - | BLy,MA1,WL2 | ⎫ |
| BL1,MA2,WL2 | BL2,MA2,WL2 | - - - - | BLy,MA2,WL2 | ⎬ n |
| ⋮ | ⋮ | ⋮ | ⋮ | |
| BL1,MAn,WL2 | BL2,MAn,WL2 | - - - - | BLy,MAn,WL2 | ⎭ |
| | | | | N |
| ⋮ | ⋮ | ⋮ | ⋮ | |
| BL1,MA1,WLx | BL2,MA1,WLx | - - - - | BLy,MA1,WLx | ⎫ |
| BL1,MA2,WLx | BL2,MA2,WLx | - - - - | BLy,MA2,WLx | ⎬ n |
| ⋮ | ⋮ | ⋮ | ⋮ | |
| BL1,MAn,WLx | BL2,MAn,WLx | - - - - | BLy,MAn,WLx | ⎭ |

SEMICONDUCTOR INTEGRATED CIRCUIT DEVICE ALLOWING FAST REWRITING OF IMAGE DATA AND IMAGE DATA PROCESSING SYSTEM USING THE SAME

BACKGROUND OF THE INVENTION

1. Field of the Invention

The present invention relates to a semiconductor integrated circuit device, and in particular to a frame buffer memory or the like used for rendering graphics in a work station or the like.

2. Description of the Background Art

A video random access memory, which is a conventional semiconductor integrated circuit device and will hereafter be referred to as "VRAM", will be described below with reference to the drawings. FIG. 28 is a block diagram showing a structure of a graphics rendering system using a conventional VRAM.

Referring to FIG. 28, the graphics rendering system includes a controller 200, a Z-buffer memory 201, a VRAM 202 and a digital/analog converter (DAC).

Controller 200 is supplied with depth coordinates Z and color data C used in three-dimensional graphics. Controller 200 is connected to Z-buffer memory 201 and VRAM 202. Depth coordinate Z is stored in Z-buffer memory 201 via controller 200, and the stored depth coordinate Z will be read to controller 200 when necessary. Color data C is stored in VRAM 202 via controller 200, and will be read from VRAM 202 to controller 200 when necessary. VRAM 202 is connected to DAC 203. Color data C stored in VRAM 202 is converted by DAC 203 from digital signals into analog signals and is output as RGB signals.

Operation of the graphics rendering system thus constructed will be described below. For example, when rendering is to be performed at a certain region on a screen, depth coordinate Z of color data C, which is currently displayed at the same region on the screen, is read from Z-buffer memory 201 into controller 202. Then, controller 200 makes comparison between read depth coordinate Z and depth coordinate Z of color data C to be subsequently rendered. If depth coordinate Z to be subsequently rendered indicates a shallower (nearer to a viewer) position than depth coordinate Z currently displayed on the screen, color data C stored in VRAM 202 is replaced with color data C to be subsequently rendered, and similarly, depth coordinate Z in Z-buffer memory 201 is rewritten. If color data C to be subsequently rendered is located at a deeper position than color data C currently displayed on the screen, it will not be viewed, so that color data C in VRAM 202 is not rewritten. The above algorithm is generally known as the Z-buffer method.

Then, a method of rewriting the color data in VRAM 202 will be described below. An alpha-blending method is generally known as the method of rewriting color data C. The alpha blending method is conducted as follows. R-, G- and B-data of 8 bits which are color data C currently stored in VRAM 202 are read from VRAM 202 by controller 200. In controller 200, newly input R-, G- and B-data of 8 bits to be subsequently rendered are increased alpha times and are blended with the R-, G- and B-data of 8 bits read from VRAM 202. The blended R-, G- and B-data are output to VRAM 202 for replacing the read R-, G- and B-data of 8 bits with the blended R-, G- and B-data of 8 bits. In this manner, color data C in VRAM 202 is replaced.

As described above, for rewriting depth coordinate Z and color data C, Z-buffer memory 201 and VRAM 202 require the read operation of reading the current screen information, i.e., depth coordinate Z and color data C from respective memories into controller 200 as well as modify-write operation of writing them again into the respective memories after the reading. For example, the read cycle time and the write cycle time in the page mode of VRAM 202 are each about 40 ns. Therefore, miscost required for rewriting color data C is (40 ns + 40 ns + rewriting time of color data at controller 200). When a read page of VRAM 202 does not hit and thus mispage occurs, a time corresponding to the RAS access time is added to the above miscost, so that a very long rewriting time is required.

For example, when a triangle is to be rendered, the following rendering time is required. FIGS. 29 and 30 are first and second figures showing an example of rendering a triangle at page-divided regions with a conventional VRAM. In the page mode of the conventional VRAM, rendering is performed a row at a time as shown in FIG. 29, so that 13 regions from a region L3 to a region L15 must be rewritten for rendering a triangle T. Assuming that 10 blocks are rewritten per one page on average, the rendering time of triangle T is (13 × RAS cycle time × (20 × CAS cycle time + color data rewriting time at controller 200)).

In order to rewrite triangle T shown in FIG. 30, writing must be performed 44 times in the page mode, which requires a very long time.

In the conventional VRAM, as described above, rewriting of depth coordinate Z and color data C requires a long time, resulting in a problem that fast rewriting of image data is impossible.

SUMMARY OF THE INVENTION

An object of the invention is to provide a semiconductor integrated circuit device which allows fast rewriting of image data and improves a rendering rate, and to provide an image data processing system using the same.

Another object of the invention is to provide a semiconductor integrated circuit device which can minimize a required power consumption for writing.

Still another object of the invention is to provide a semiconductor integrated circuit device which can be used both for depth coordinates and color data without changing the type of the device.

Yet another object of the invention is to provide a semiconductor integrated circuit device which can arbitrarily change an order of output of color data.

Further another object of the invention is to provide a semiconductor integrated circuit device which can perform copy of image data within a cache memory.

A semiconductor integrated circuit device according to an aspect of the invention for storing image data corresponding to a screen formed of a plurality of pixels arranged in N rows and M columns (N and M are integers larger than one), includes a main memory storing the image data, a cache memory storing a portion of the image data stored in the main memory, and a first data bus transferring the image data between the main memory and the cache memory. The main memory activates a storage region storing the image data corresponding to the pixels in n rows and m columns on the screen (n and m are integers larger than one, n<N, m<M) in a first page mode for transferring the image data with respect to the cache memory.

According to the above structure, the main memory activates the storage region storing the image data corresponding to the pixels in n rows and m columns, i.e., rectangular region on the screen in the first page mode transferring the image data with respect to the cache memory, so that the image data corresponding to the rectangular region on the screen can be transferred fast from the main memory to the cache memory. Consequently, the number of times of access of data decreases, so that the image data can be rewritten fast, and the rendering rate can be improved.

More preferably, in addition to the above structures, the device includes a serial access memory storing the image data output from the main memory and outputting the stored image data onto the screen, and a second image data bus transferring the image data from the main memory to the serial access memory.

The main memory activates the storage region storing the image data corresponding to the pixels in one row and M columns on the screen in a second page mode for transferring the data to the serial access memory.

According to the above structure, a page form of n rows and m columns is activated in the first page mode for transferring the image data between the cache memory and the main memory, and a page form of one row and M columns is activated in the second page mode for transferring the image data from the main memory to the serial access memory. Therefore, the page can be activated in accordance with the form suitable to the respective memories, and thus the image data can be transferred fast to the respective memories. Further, the form of page to be activated by the main memory can be changed in accordance with the structure of the memory for data transfer, so that row select lines and sense amplifiers which are not required for the data transfer are not activated, and thus the power consumption for the access can be reduced.

A semiconductor integrated circuit device according to another aspect of the invention for storing image data corresponding to a screen formed of a plurality of pixels arranged in N rows and M columns (N and M are integers larger than one), includes a main memory storing the image data, and an activating circuit for activating a first storage region of the main memory storing the image data corresponding to the pixels at a first region on the screen in a first page mode and activating a second storage region storing the image data corresponding to the pixels at a second region on the screen different in form from the first region in a second page mode different from the first page mode.

According to the above structure, the first storage region is activated in the first page mode, and the second storage region is activated in the second page mode, so that it is possible to change the storage region to be activated in accordance with the image data to be transferred. Therefore, it is possible to select the optimum page form in accordance with the structure of the memory performing output from the main memory. Consequently, the number of times of data access decreases, so that the image can be rewritten fast and the rendering rate can be improved. Further, unrequired row select lines and sense amplifiers are not activated, and thus the current consumption for the access can be reduced.

A semiconductor integrated circuit device according to still another aspect of the invention includes a main memory storing image data formed of at least one of a depth coordinate and color data, a comparison result signal output terminal for externally outputting a comparison result signal indicative of a result of comparison made between positions of the depth coordinate stored in the main memory and the newly input depth coordinate, and a comparison result signal input terminal for internally inputting the externally input comparison result signal. The main memory performs rewriting of the stored color data in accordance with the comparison result signal sent from the comparison result signal input terminal, when the main memory stores the color data. The comparison result signal output terminal is disposed at a side opposite to the comparison result signal input terminal.

According to the above structure, the comparison result signal output terminal is disposed at the side opposite to the comparison result signal input terminal. Therefore, when two semiconductor integrated circuit devices are arranged in series, it is possible to reduce a distance between the comparison result signal input terminal of one of the semiconductor integrated circuit devices and the comparison result signal output terminal of the other, and the comparison result signal input terminal of one of the semiconductor integrated circuit device can be easily connected to the comparison result signal output terminal of the other. Further, a length of the connection line can be short, so that a delay time during transference can be reduced.

According to a semiconductor integrated circuit device of yet another aspect of the invention includes a main memory storing image data, a comparison result signal input terminal for internally inputting an externally input comparison result signal, and a clock signal input terminal for inputting a clock signal forming a reference of operation of the device. The main memory performs rewriting of the stored image data in accordance with the comparison result signal. The comparison result signal input terminal is disposed at a side opposite to the clock signal input terminal.

According to the above structure, the comparison result signal input terminal is disposed at the side opposite to the clock signal input terminal. Therefore, in the operation of receiving the signal input to the comparison result signal input terminal in accordance with the input clock signal, the clock signal delays within the device after the clock signal is input to the clock signal input terminal. Accordingly, it is possible to ensure a sufficient set-up time of the semiconductor integrated circuit device.

A semiconductor integrated circuit device according to a further aspect of the invention includes a main memory storing a depth coordinate of image data, a comparison result signal output terminal for externally outputting a comparison result signal indicative of a result of comparison made between positions of the depth coordinate of the image data stored in the main memory and the depth coordinate of the newly input image data, and a clock signal input terminal for inputting a clock signal forming a reference of operation of the device. The comparison result signal output terminal is disposed at the same side as the clock signal input terminal.

According to the above structure, comparison result signal output terminal is disposed at the same side as the clock signal input terminal. This reduces a distance between the comparison result signal output terminal and the clock signal input terminal, so that the comparison result signal can be output fast in response to the clock signal.

According to a further aspect of the invention, a semiconductor integrated circuit device having four sides includes an image data input terminal for inputting externally input image data into the device, a cache memory storing the image data input through the image data input terminal, a main memory storing the image data stored in the cache memory, a serial access memory storing the image data stored in the main memory, and an image data output terminal for externally outputting the image data sent from the serial access memory. The image data output terminal is disposed at one of the four sides, and the image data input terminal is disposed at a side other than said one side.

According to the above structure, since the image data input terminal is disposed at the side other than the one side at which the image data output terminal is disposed, no interference occurs between the signal sent through the image data input terminal and the signal sent from the image data output terminal, so that both the signals do not receive noises.

A semiconductor integrated circuit device according to a further aspect of the invention includes a main memory storing image data formed of at least one of a depth coordinate and color data, a comparing circuit for outputting a comparison result signal indicative of a result of comparison made between positions of the depth coordinate of image data stored in the main memory and the depth coordinate of newly input image data when the main memory stores the depth coordinate of the image data, a comparison result signal output terminal for externally outputting the comparison result signal sent from the comparing circuit, a comparison result signal input terminal for internally inputting the externally input comparison result signal, and a control circuit for controlling rewriting of the color data stored in the main memory in response to the comparison result signal sent from the comparison result signal input terminal when the main memory stores the color data.

According to the above structure, when two semiconductor integrated circuit devices are provided, one used for the depth coordinate and the other used for the color data, the color data of the semiconductor integrated circuit device used for the color data can be rewritten in accordance with the comparison result signal sent from the semiconductor integrated circuit device used for the depth coordinate, so that it is not necessary to transfer externally the color data and depth coordinate, and thus the image data can be rewritten fast. As a result, one kind of semiconductor integrated circuit devices can be used for the depth coordinate and color data, so that the flexibility of the device can be improved. Since the operation of rewriting the color data is controlled in response to the comparison result signal, the number of times of data access is reduced, so that the image data can be rewritten fast, and the rendering rate can be improved.

A semiconductor integrated circuit device according to a further aspect of the invention includes a main memory storing image data, a data bus transmitting the image data sent from the main memory, a cache memory storing the image data transmitted through the data bus, a logical operation unit performing predetermined logical operation on the image data sent from the cache memory and the externally supplied image data, and a storage region specifying circuit for storing again the image data processed by the logical operation unit in an intended storage region of the cache memory.

According to the above structure, the image data on which the predetermined logical operation is performed can be stored again in the intended storage region of the cache memory, so that the image data can be copied within the cache memory. Therefore, the number of times of data access is reduced, so that the image data can be rewritten fast, and the rendering rate can be improved.

A semiconductor integrated circuit device according to a further aspect of the invention includes a main memory storing image data, a data bus transmitting the image data sent from the main memory, a cache memory storing the image data transmitted through the data bus, a write detecting circuit for detecting a memory cell in the cache memory on which writing is performed, and a control circuit for controlling the cache memory to supply only the data of the memory cell of which writing is detected by the write detecting circuit to the main memory from the cache memory via the data bus.

According to the above structure, only the data of the memory cell at which the writing was occurred is supplied from the cache memory to the main memory. Therefore, it is not necessary to transmit unnecessary data, and thus the power consumption required for writing the data into the main memory can be minimized.

A semiconductor integrated circuit device according to a further aspect of the invention includes a first serial access memory storing first image data, a second serial access memory storing second image data different from the first image data, an output circuit for outputting alternately the first image data output from the first serial access memory and the second image data output from the second serial access memory in response to a predetermined clock signal, and a control circuit for controlling the output circuit to change the order of output of the first image data and the second image data in response to a predetermined control signal.

According to the above structure, since the order of output of the first image data and the second image data is changed in response to the control signal, the order of output of the image data can be arbitrarily changed. Therefore, even if the arbitrary image data is stored in the main memory, the image data can be output in the predetermined order.

An image data processing system according to a further aspect of the invention includes a plurality of semiconductor integrated circuit devices each having a storage capacity of A Mbits and outputting image data of C bits in a data transfer rate of B nsec, and an output circuit receiving image data output from at least four semiconductor integrated circuit devices among the plurality of semiconductor integrated circuit devices and outputting image data of 2C bits at a data transfer rate of B/2 nsec.

According to the above structure, the image data output from the plurality of semiconductor integrated circuit devices can be received, and the double image data can be output in the double data transfer rate by the output circuit. Therefore, the image data can be output fast, the image data can be rewritten fast, and the rendering rate can be improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 17 shows correspondence between data of data bank memory on the screen;

DESCRIPTION OF THE PREFERRED EMBODIMENTS

Figure 1:
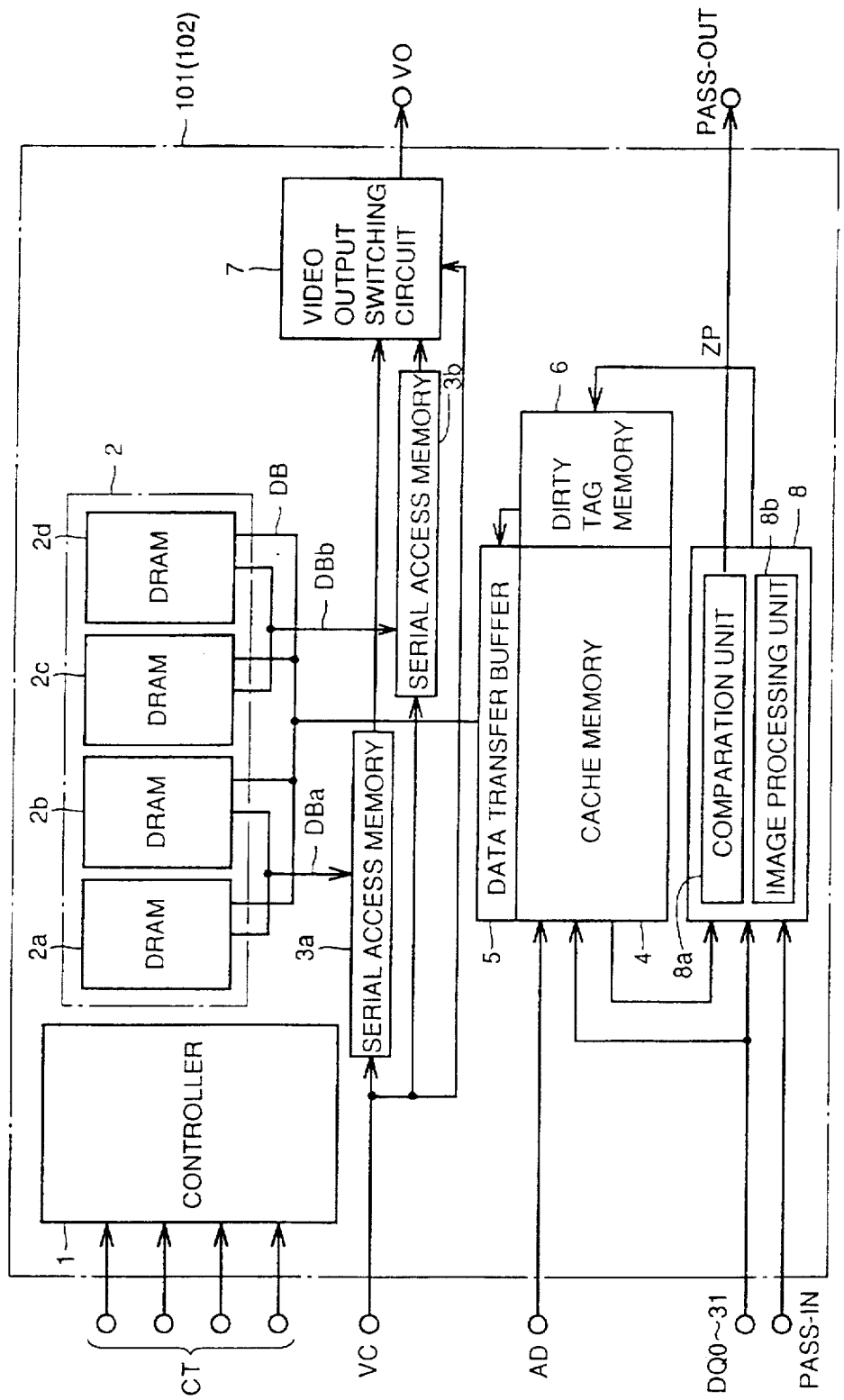
FIG. 1 is a block diagram showing a structure of a frame buffer memory of an embodiment of the invention.

A frame buffer memory which is a semiconductor integrated circuit device of an embodiment of the invention will be described below with reference to the drawings. FIG. 1 is a block diagram showing a structure of the frame buffer memory of the embodiment of the invention.

Referring to FIG. 1, a frame buffer memory 101 includes a controller 1, a data bank memory 2, serial access memories 3a and 3b, a cache memory 4, a data transfer buffer 5, a dirty tag memory 6, a video output switching circuit 7 and an operating portion 8. Data bank memory 2 includes, for example, four DRAMs (Dynamic Random Access Memories) 2a–2d. Operating portion 8 includes a comparing unit 8a and an image processing unit 8b.

Controller 1 is externally supplied with various control signals via control signal input terminals CT, and outputs predetermined control signals used in respective internal blocks in response to the various control signals supplied thereto.

Data bank memory 2 is formed of four independent banks, i.e., four DRAMs 2a–2d, and stores image data to be displayed on a screen. As the image data, depth coordinates Z or color data C are stored as will be described later. Four DRAMs 2a–2d are connected to data transfer buffer 5 via a data bus DB. Data bus DB has a bus width corresponding to the address block which is a storage unit of cache memory 4. DRAMs 2a and 2b are connected to serial access memory 3a via a data bus DBa, and DRAMs 2c and 2d are connected to a serial access memory 3b via a data bus DBb.

Serial access memories 3a and 3b are supplied with a video clock signal from a video clock signal input terminal VC. Serial access memories 3a and 3b output the image data output from DRAMs 2a–2d to video output switching circuit 7 in response to the video clock signal.

Video output switching circuit 7 receives the video clock signal from video clock signal input terminal VC, and alternately outputs the image data sent from serial access memories 3a and 3b in response to the input video clock signal. The image data thus output forms data according to scan lines on the screen.

Data transfer buffer 5 is connected to cache memory 4 and dirty tag memory 6. Dirty tag memory 6 detects the memory cell of which data is written into cache memory 4, and outputs a write detecting signal corresponding to the detection result to data transfer buffer 5. Data transfer buffer 5 outputs only the data of the memory cell, which data is written into cache memory 4, via data bus DB to DRAMs 2a–2d.

Cache memory 4 receives the image data of 32 bits from image data input terminals DQ0–DQ31, and also receives an address signal of 6 bits from an address input terminal AD. Cache memory 4 is formed of a triple-port SRAM (Static Random Access Memory) which can simultaneously perform reading, writing and reading/writing with respect to data bank memory 2. The image data sent to image data input terminals DQ0–DQ31 is depth coordinate Z and/or color data C, and required data is appropriately set to them.

Operating portion 8 receives the image data from image data input terminals DQ0–DQ31, receives the image data from cache memory 4, and receives a comparison result signal ZP, which will be described later, from a comparison result signal input terminal PASS-IN. Comparison unit 8a compares depth coordinate Z, which is supplied via data bus DB, data transfer gate 5 and cache memory 4 and is currently displayed on the screen, with depth coordinate Z of the image, which is supplied via image data input terminals DQ0–DQ31 and is to be subsequently displayed, for determining difference/coincidence. The result of determination of difference/coincidence is externally output as comparison result signal ZP via a comparison result signal output terminal PASS-OUT. Image processing unit 8b performs predetermined operation relating to the R-, G- and B-color data, and specifically performs the operation on color data C, which is similarly supplied from data bank memory 2 and is currently displayed on the screen, and color data C, which is supplied from an image data input terminal D and is to be subsequently displayed. Image processing unit 8b detects whether rewriting of color data is to be actually done or not in response to comparison result signal ZP supplied through comparison result signal input terminal PASS-IN.

Figure 2:
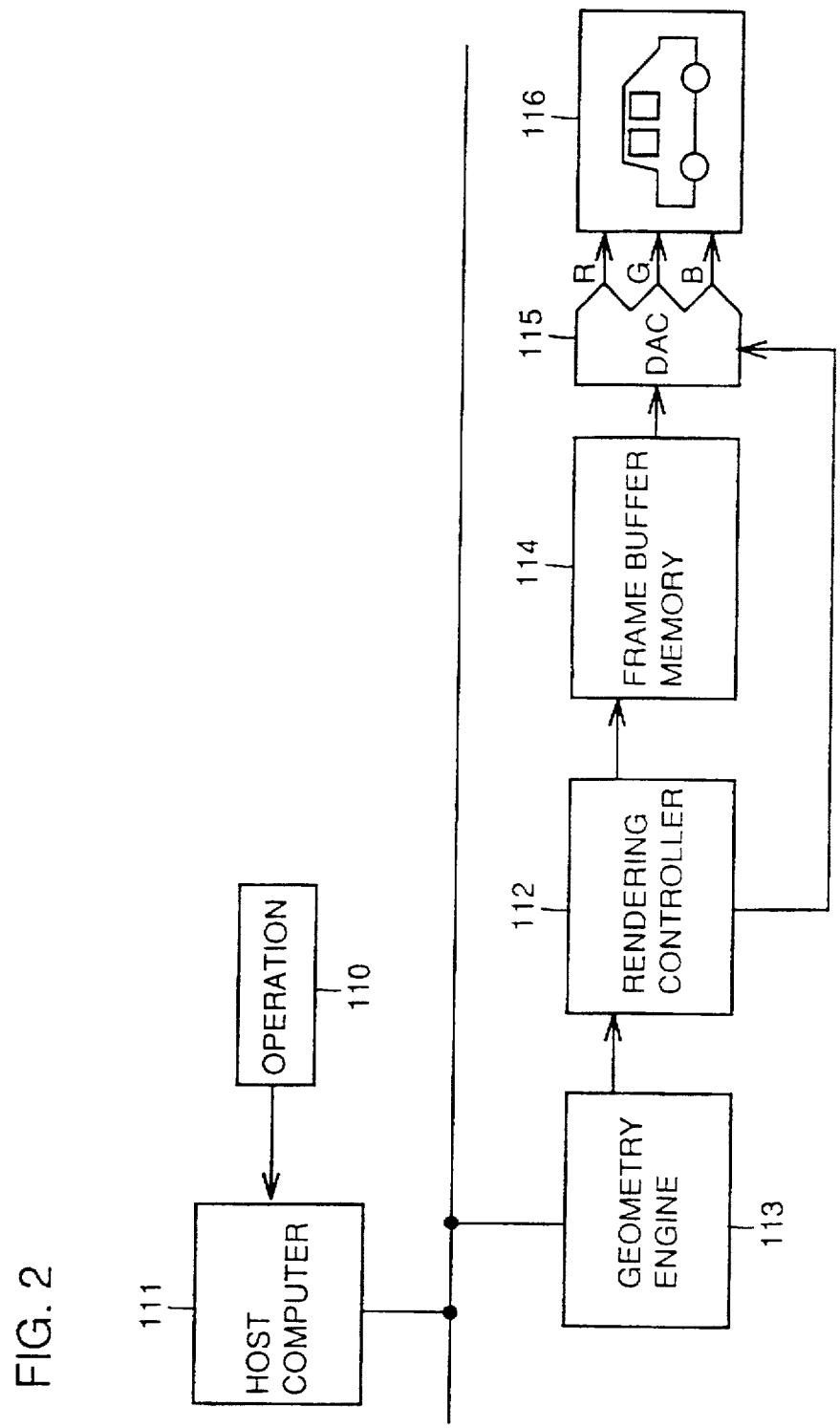
FIG. 2 is a block diagram showing a structure of a first graphics rendering system using the frame buffer memory shown in FIG. 1.

Then, the graphics rendering system which is the image data processing system using the frame buffer memory shown in FIG. 1 will be described below with reference to the drawings. FIG. 2 is a block diagram showing a structure of a first graphics rendering system using the frame buffer memory shown in FIG. 1.

Referring to FIG. 2, the graphics rendering system includes a host computer 111, a rendering controller 112, a geometry engine 113, a frame buffer 114 shown in FIG. 1, an RAMDAC (Random Access Memory Digital/Analog Converter) 115 and a screen 116.

The graphics rendering system shown in FIG. 2 is used, for example, as a CAD (Computer Aided Design) system used for designing automobiles. When an user inputs a rendering operation 110, a movement instruction signal is input to host computer 111. In accordance with the movement instruction signal, host computer 111 outputs to rendering controller 112 color control data for coloring an automobile rendered on screen 116, and also outputs position control data to geometry engine 113. Rendering controller 112 outputs the color data corresponding to the input color control data to frame buffer 114. Geometry engine 113 inputs depth coordinate Z corresponding to the input position control data to frame buffer memory 114. Frame buffer memory 114 performs predetermined processing, which will be described later, and outputs the color data to RAMDAC 115. RAMDAC 115 outputs the analog signal of RGB data to screen 116. On the screen 116, the color and position of the automobile being rendered change in accordance with the RGB data. Accordingly, the user can design the automobile.

Figure 3:
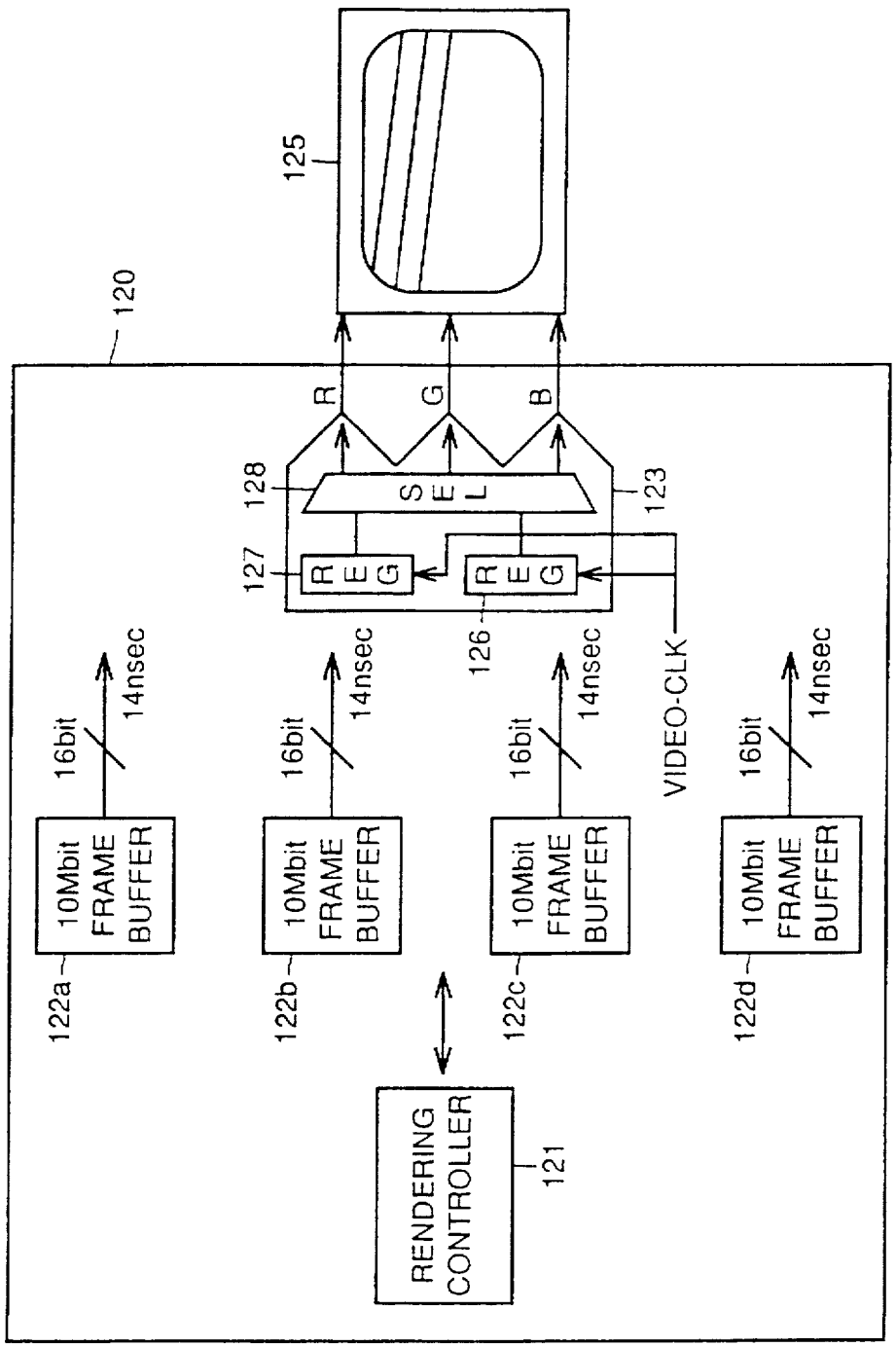
FIG. 3 is a block diagram showing a structure of a second graphics rendering system using the frame buffer memory shown in FIG. 1.

Then, a second graphics rendering system using the frame buffer memory shown in FIG. 1 will be described below. FIG. 3 is a block diagram showing a structure of the second graphics rendering system using the frame buffer memory shown in FIG. 1.

Referring to FIG. 3, the graphics rendering system includes an image data processing device 120 and a screen 125. Image data processing device 120 includes a rendering controller 121, frame buffer memories 122a–122d, and an RAMDAC 123. RAMDAC 123 includes registers 126 and 127 and a selector 128.

Rendering controller 121 outputs image data for representing the image on screen 125 to respective frame buffers 122a–122d. Each of frame buffers 122a–122d has a storage capacity of 10 Mbits, and outputs the image data of 16 bits to RAMDAC 123 at a data transfer rate of 14 nsec. Registers 126 and 127 have four register portions corresponding to respective frame buffers 122a–122d, and store the image data output from respective frame buffer memories 122a–122d. Registers 126 and 127 output the image data stored in the respective register portions to selector 128 in synchronization with a video clock signal VIDEC-CLK. Selector 128 outputs the input image data to screen 125 as R-, G- and B-data.

Generally, one pixel on screen 125 has color information which is data of 32 bits representable by 8R, 8G, 8B and 8α (fraction: transmission factor). The size of screen used in a work station or the like is 1280×1024 pixels. Therefore, the required capacity of the data for one screen is 1280×1024× 32=40 Mbits. Thus, the storage capacity required for frame buffers 122a–122d is 40 Mbits. Further, in order to render the image data on the screen at a high speed, it is necessary, in view of restriction by a hardware, to read the data of 32 bits per pixel every 7 nanoseconds from frame buffer memories 122a–122d, and transfer the read data to the screen. Thus, the specification required for frame buffer memories 122a–122d is that they have the storage capacity of 40 M bits, the data transfer rate is 7 nsec, the output pins are 32 in number, and they have fast multi-bit structure.

Even if it is intended to achieve the aforementioned structure with one chip, the technology of 16-Mbit DRAM generation at the highest is available according to the current volume-producible MOS memory device technology, so that actual production is impossible. However, four frame buffer memories arranged in parallel as shown in FIG. 3 can achieve the above structure, if each frame buffer memory satisfies the specification that the storage capacity is 10 Mbits, the data transfer rate is 14 nsec, and the output pins are 16 in number. In this case, therefore, mass production is allowed by the present MOS memory device technology.

Figure 4:
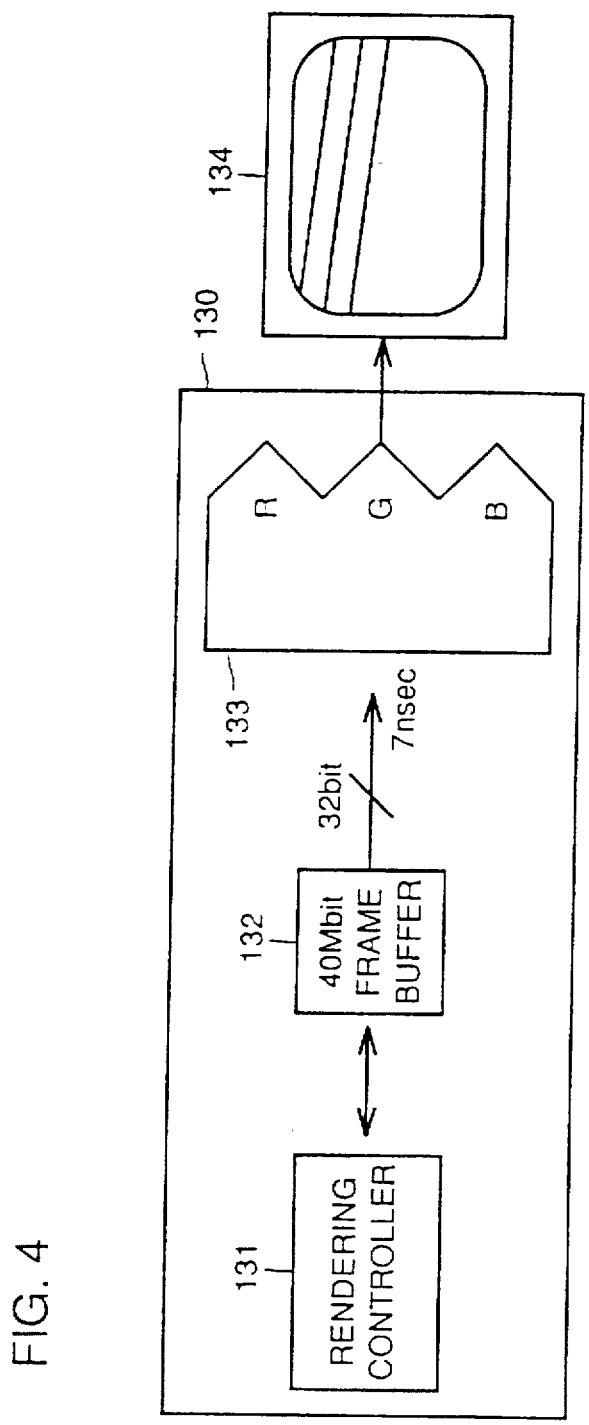
FIG. 4 is a block diagram showing a structure of a graphics rendering system equivalent to the graphics rendering system shown in FIG. 3.

Thus, by using the system structure shown in FIG. 3, the outputs of four frame buffer memories 122a–122d may be temporarily received and then selectively output, whereby the data transfer rate of each frame buffer memory is doubled, and the quantity of data transferred at a time is doubled. Therefore, the system shown in FIG. 3 is equivalent to a system shown in FIG. 4. FIG. 4 is a block diagram showing a structure of the graphics rendering system equivalent to the system shown in FIG. 3.

Referring to FIG. 4, the graphics rendering system includes an image processing device 130 and a screen 134. Image processing device 130 includes a rendering controller 131, a frame buffer 132 and an RAMDAC 133.

In the graphics rendering system shown in FIG. 3, as described above, there are provided four frame buffer memories 122a–122d, the output data of each of frame buffer memories 122a–122d is temporarily stored in registers 126 and 127 of RAMDAC 123, and selector 128 selectively outputs double the data of each of frame buffer memories 122a–122d at the double transfer rate to screen 125. Therefore, the data output from frame buffer memories 122a–122d is equivalent to the data of 32 bits output from frame buffer 132 shown in FIG. 4 at the data transfer rate of 7 nsec. As a result, the graphics rendering system shown in FIG. 3 can perform fast transference of the image data and fast rendering of the image on screen 125.

The description has been given on the system for color data. However, if the system is to be used for the color data and depth coordinate, 8 frame buffer memories may be used, four being used for the color data and the remaining four being used for the depth coordinate, whereby the structure can be similar to that described before. In connection with the data transfer rate of frame buffer memories, if it is not higher than 14 nsec, similar effect can be achieved.

Output transistors in the frame buffer memory shown in FIG. 1 will be described below. Conventionally, memories used for frame buffers are formed of standard DRAMs, video RAMS, synchronous DRAMs and/or others. Since all of these memories are prepared from standard DRAMs by setting appropriate specification, they may not be optimized for the use as the frame buffer.

For example, the transistor size for the output pins is not optimized, and in general, the output current of the standard DRAM is defined on the assumption that the output is received by TTL (Transistor-Transistor Logic) or LVTTL (Low Voltage TTL). In the prior art, since video outputs of the video RAM and synchronous DRAM do not support 16-output/14 nsec, a user arranges the devices in parallel to each other, uses certain ASICs (Application Specification ICs) for temporarily receiving the outputs of video RAMs and synchronous DRAMs, subsequently prepares an output signal satisfying 16-output/14 nsec which is supplied to the RAMDAC. Therefore, the output current specifications of the video RAM and synchronous DRAM must be the same as that of the standard DRAM, i.e., standard specification, and thus must be compatible with TTL and LVTTL.

For example, if two NMOS transistors connected in series between a power supply voltage and a ground potential are used as an output circuit, relationships of IOH=−2mA and IOL=4mA are satisfied, where IOH represents a current flowing through the transistor connected to the power supply voltage, IOL represents a current flowing through the transistor connected to the ground potential, and "+" represents a direction of the current flowing toward a memory including the above output circuit. In order to satisfy the above conditions of output currents, a transistor having a gate width W of 600 μm is required. Therefore, in the frame buffer memories 122a–122d used in the graphics rendering system shown in FIG. 3, and more generally, in the frame buffer memories having a cycle time of 14 nsec and 16 output pins per chip, transistors would generate noises if the transistors were extraordinarily large as described above. Accordingly, the memory for the frame buffer must use an output circuit including transistors of a smaller size.

Figure 5:
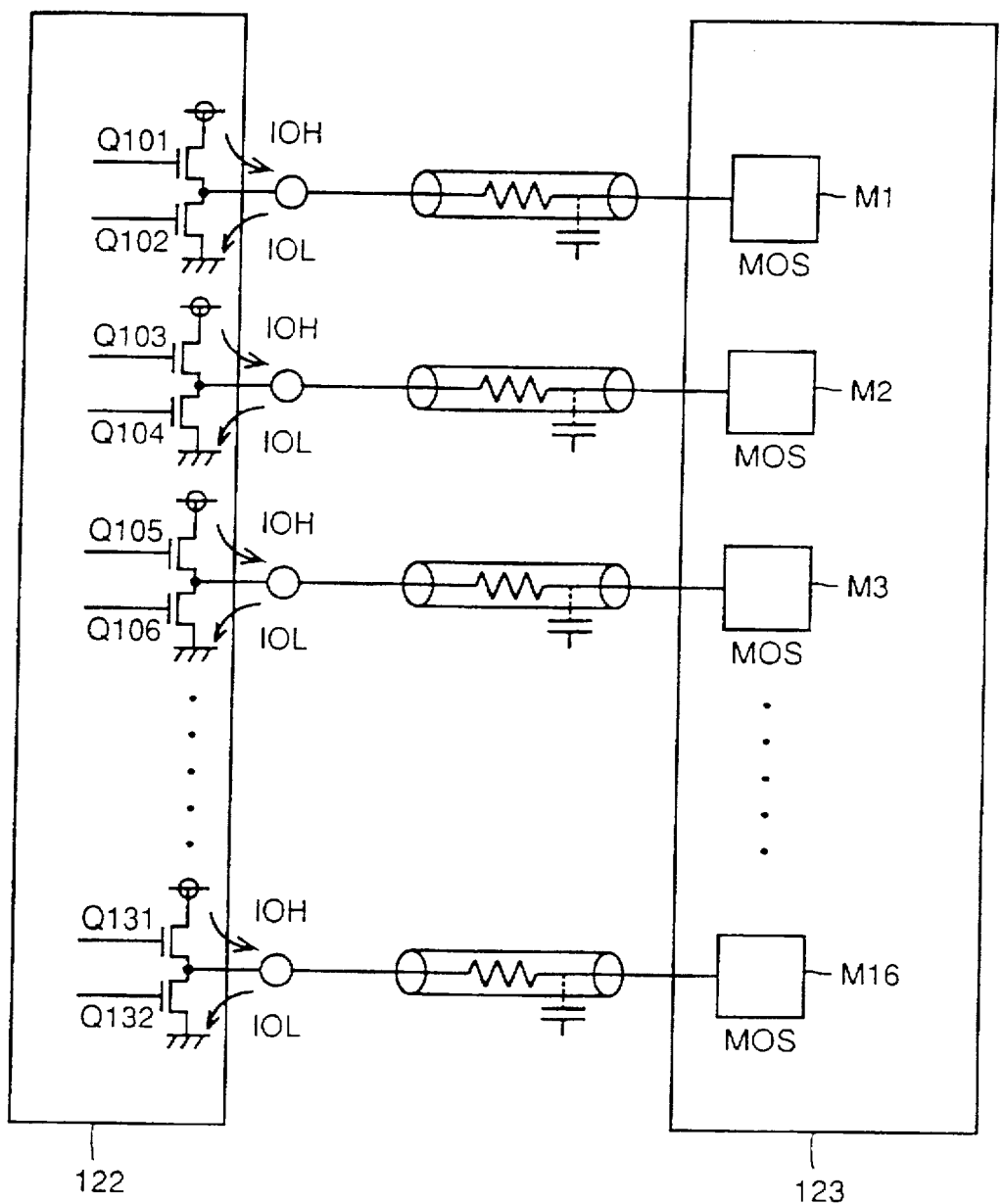
FIG. 5 shows a structure of an output portion of the frame buffer memory shown in FIG. 3.

FIG. 5 shows a structure of the output portion of the frame buffer memory shown in FIG. 3. Referring to FIG. 5, frame buffer memory 122 includes NMOS transistors Q101, Q102–Q131 and Q132. RAMDAC 123 includes MOS input portions M1–M16.

Transistors Q101 and Q102 are connected in series between a power supply voltage Vcc and a ground potential. One bit in the output signal of frame buffer memory 122 is output from a connection between transistors Q101 and Q102. The connection between transistors Q101 and Q102 is connected to an MOS input portion M1 of RAMDAC 123 via a predetermined connection line. Other transistors Q103, Q104–Q131 and Q132 are arranged similarly.

Transistors Q101, Q102–Q131 and Q132 have a gate width W of, e.g., 210 μm, in which case the currents flowing through the transistors are expressed as IOH=−0.1 mA and IOL=0.1 mA. Since the gate width of transistors Q101–Q108 is small, the transistors do not generate a noise. Since transistors Q101 and Q102 operate fast, RAMDAC 123 can receive on its MOS inputs the output signals as they are.

Figure 6:
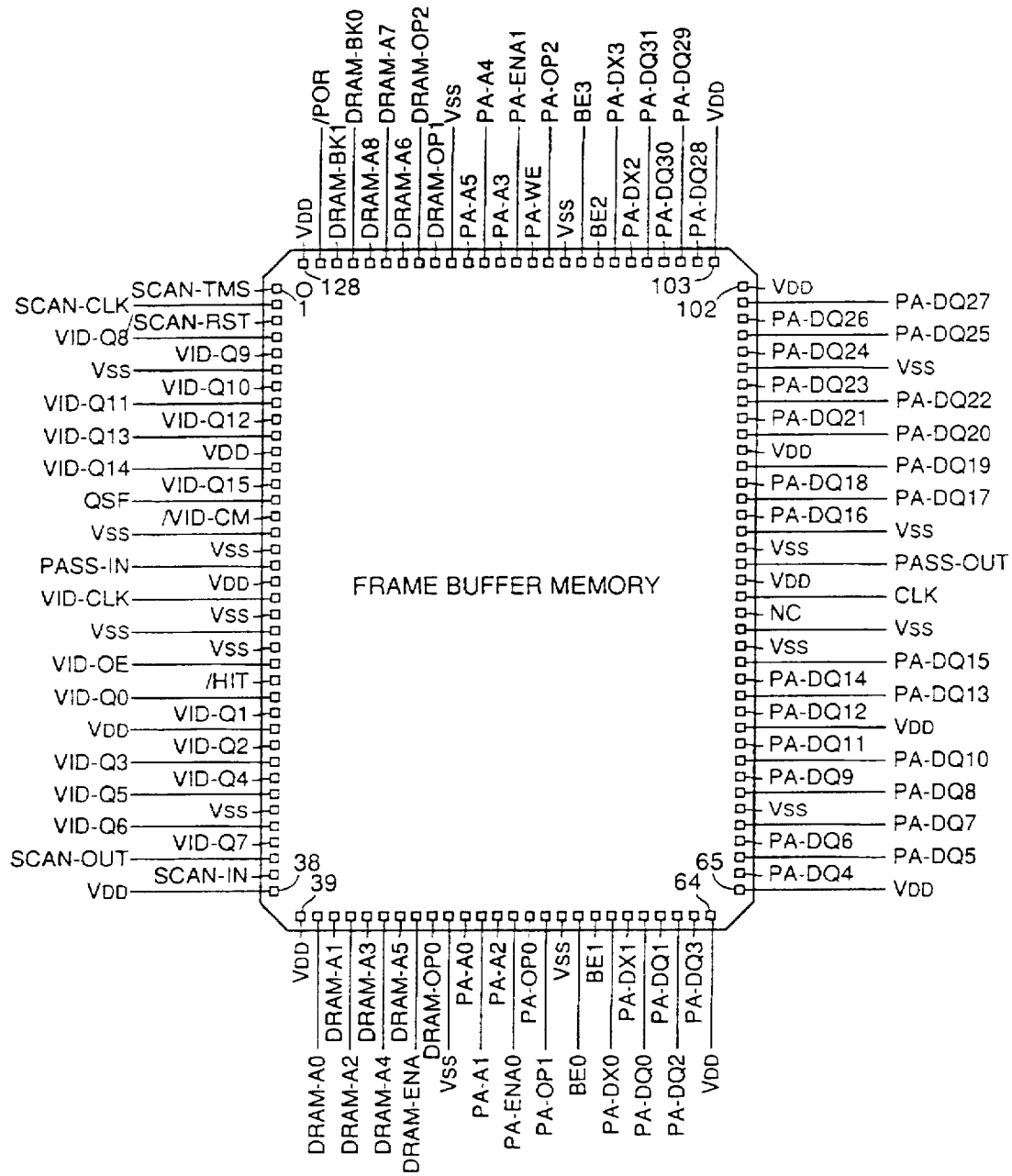
FIG. 6 shows pin arrangement in the frame buffer memory shown in FIG. 1.

Description will now be given on pin arrangement of the frame buffer memory shown in FIG. 1. FIG. 6 shows the pin arrangement of the frame buffer memory shown in FIG. 1.

Comparison result signal input terminal PASS-IN receiving comparison result signal ZP is located at the middle of the left side in the figure, and comparison result signal output terminal PASS-OUT outputting comparison result signal ZP is disposed at the middle of the right side, i.e., opposite side. Near terminal PASS-OUT, there is disposed a terminal CLK receiving the clock signal forming a reference of the operation of frame buffer memory 150. Video output terminals VID-Q0–VID-Q15 (corresponding to video output terminal VO shown in FIG. 1) for outputting the image data of 16 bits are disposed at the same side as terminal PASS-IN.

Data input terminals PA-DQ0–PA-DQ31 (corresponding to terminals DQ0–DQ31 shown in FIG. 1) receiving the image data of 32 bits are disposed at a side of the chip other than the side at which video output terminals VID-Q0–VID-Q15 are disposed.

Description will be given on an effect of the arrangement of video output terminals VID-Q0–VID-Q15 and image data input terminals PA-DQ0–PA-DQ31. Output of signals from video output terminals VID-Q0–VID-Q15 is synchronized with the video clock signal forming the reference signal for video output. The video clock signal is supplied via terminal VID-CLK, and has the frequency of 70 MHz. The image data supplied via image data input terminals PA-DQ0–PA-DQ31 is supplied into the device in synchronization with the clock signal forming the system clock of frame buffer memory 150. This clock signal is supplied via terminal CLK, and has a frequency of 100 MHz. Thus, the video output signal and the image data input signal are output and input in synchronization with different block signals. Therefore, if video output terminals VID-Q0–VID-Q15 were disposed near image data input terminals PA-DQ0–PA-DQ31, both signals would interfere with each other in some cases, causing noises. In this embodiment, therefore, video output terminals VID-Q0–VID-Q15 and image data input terminals PA-DQ0–PA-DQ31 are disposed as shown in FIG. 6, whereby a long distance is ensured between them, suppressing mutual influence by noises.

Figure 7:
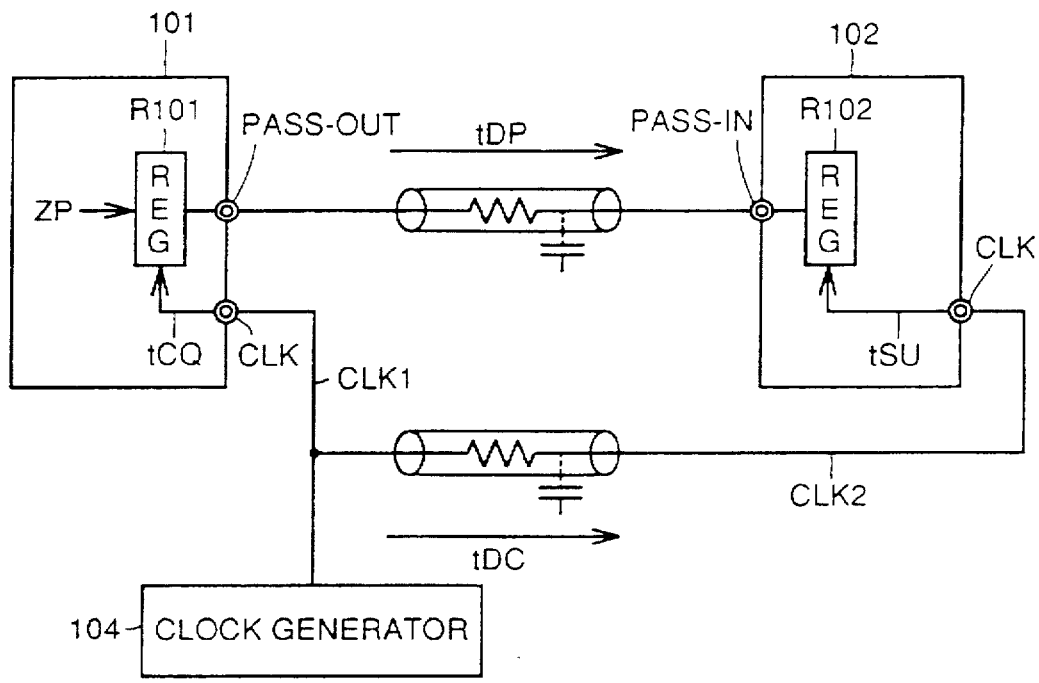
FIG. 7 shows an effect of the pin arrangement shown in FIG. 6.

Description will now be given on the effect by the arrangement of comparison result signal input terminal PASS-IN, comparison result signal output terminal PASS-OUT and system clock input terminal CLK. FIG. 7 is a diagram showing an effect of the arrangement of the comparison result signal input terminal, comparison result signal output terminal and system clock input terminal.

Referring to FIG. 7, a frame buffer memory 101 is used for depth coordinates, and has a structure shown in FIG. 1. A frame buffer memory 102 is used for color data, and has a structure shown in FIG. 1. System clock input terminals CLK of frame buffer memories 101 and 102 are supplied with system clock signals CLK1 and CLK2 from a clock generator 104, respectively. In FIG. 7, the system clocks supplied from clock generator 104 are the same system clock signal, but, in order to clarify the influence by delay at transmission paths, the system clock sent to frame buffer memory 101 is represented as system clock CLK1, and the system clock sent to frame buffer memory 102 is represented as system clock CLK2.

Frame buffer memories 101 and 102 include registers R101 and R102 (which are not shown in FIG. 1), respectively. Register R101 stores comparison result signal ZP, and outputs the same to comparison result signal input terminal PASS-IN of frame buffer memory 102 via comparison result signal output terminal PASS-OUT in response to system clock CLK1. Register R102 outputs received comparison result signal ZP in response to system clock CLK2.

According to the above structure, an access time tCQ is required in frame buffer memory 101 after system clock signal CLK1 was applied and before comparison result signal ZP is output from terminal PASS-OUT in response to the same. In frame buffer memory 102, a set-up time tSU is required before system clock signal CLK2 rises after comparison result signal ZP was input to terminal PASS-IN. At respective transmission paths, comparison result signal ZP is delayed by a delay time tDP, and system clock signal CLK2 is delayed by a delay time tDC.

Figure 8:
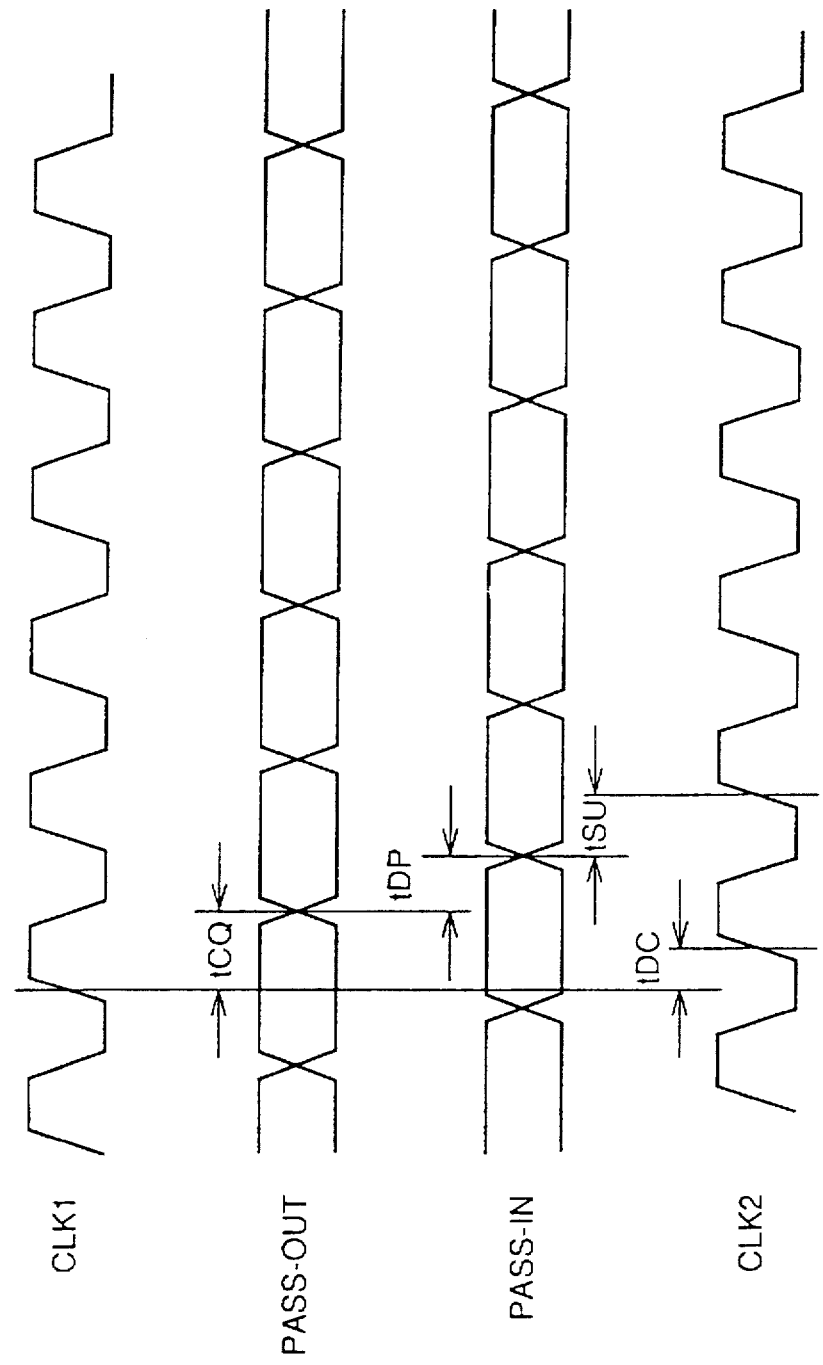
FIG. 8 is a timing chart showing operation of the system shown in FIG. 7.

Operation of the system thus constructed will be described below. FIG. 8 is a timing chart showing the operation of the system shown in FIG. 7. Referring to FIG. 8, when system clock CLK1 rises, comparison result signal ZP is output from terminal PASS-OUT after elapsing of access time tCQ. Then, comparison result signal ZP is supplied to terminal PASS-IN after being further delayed by delay time tDP. System clock CLK2 rises with delay of delay time tDC with respect to the rise of system clock CLK1. Therefore, set-up time tSU shown in FIG. 8 results.

According to the above structure, since terminal CLK receiving system clock CLK1 is disposed near terminal PASS-OUT, access time tCQ is very short, and thus fast access can be achieved. Since terminal PASS-IN is disposed at the side opposite to terminals PASS-OUT and CLK, terminal PASS-OUT can be connected to terminal PASS-IN via a short path, so that delay time tDP can be reduced. Since terminal CLK is spaced from terminal PASS-IN by a long distance, system clock signal CLK2 is delayed before it arrives at register R102, so that set-up time tSU can be further increased, providing a margin.

Figure 9:
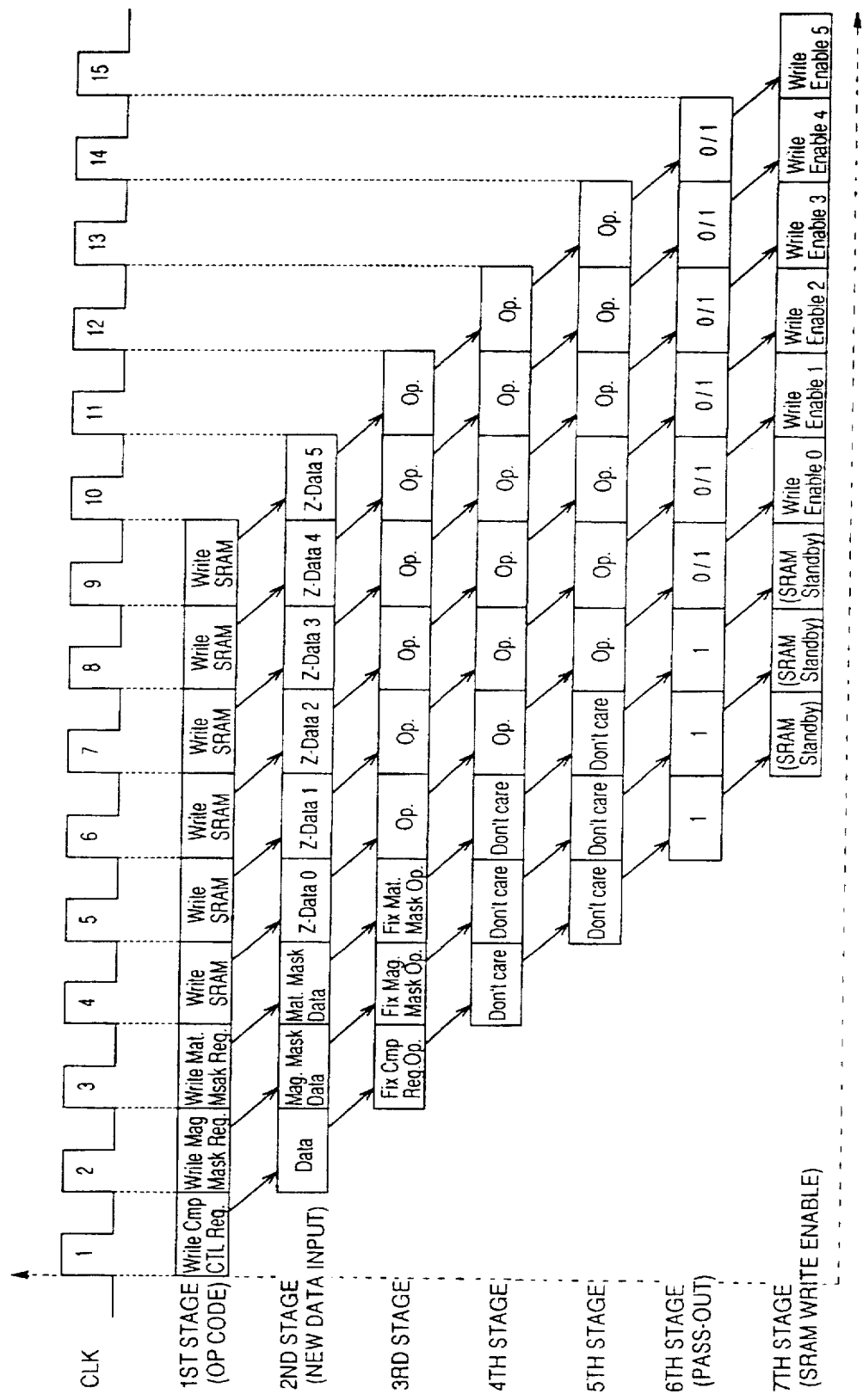
FIG. 9 shows a process of producing a comparison result signal shown in FIG. 8.

Description will now be given on a process of producing comparison result signal ZP output from terminal PASS-OUT shown in FIG. 8. FIG. 9 is a timing chart showing the process of producing comparison result signal ZP.

Frame buffer memory 101 shown in FIG. 7 is provided with pixel processing unit 8b already described with reference to FIG. 1. Pixel processing unit 8b performs pipeline processing of 7 stages. FIG. 9 shows the pipeline processing in the pixel processing unit. At the first stage, writing of data into the SRAM, i.e., cache memory 4 is performed. Input of data is performed at the second stage, and respective operations are performed at third to fifth stages. Comparison result signal ZP is successively produced at the sixth stage.

Figure 10:
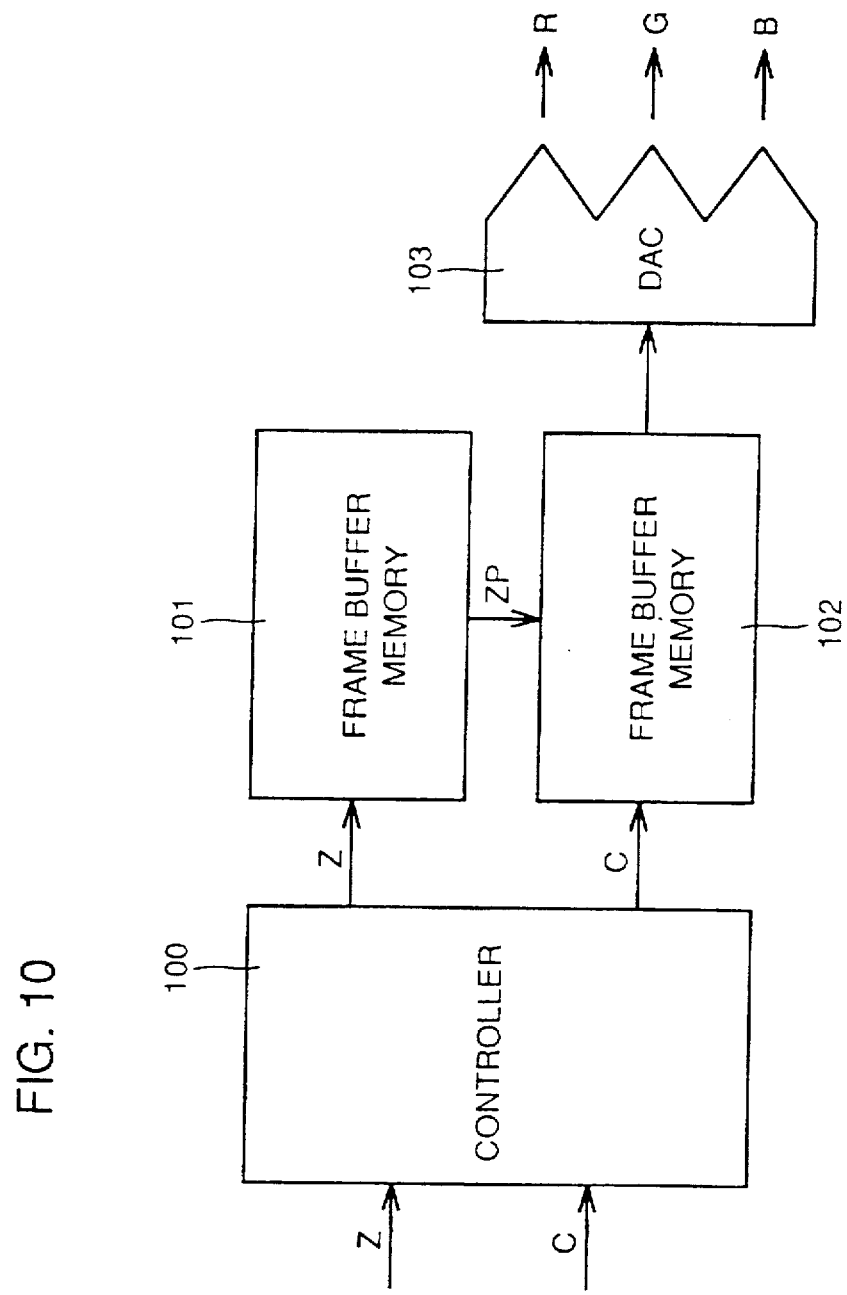
FIG. 10 is a block diagram showing a structure of a third graphics rendering system using the frame buffer memory shown in FIG. 1.

A third graphics rendering system using frame buffer memories 101 (102) shown in FIG. 1 will be described below with reference to FIG. 10. FIG. 10 is a block diagram showing a structure of the third graphics rendering system using frame buffer memories 101 (102) shown in FIG. 1.

Referring to FIG. 10, the graphics rendering system includes a controller 100, frame buffer memories 101 and 102, and an RAMDAC 103.

Controller 100 is supplied with depth coordinate Z and color data C. Controller 100 outputs depth coordinate Z to frame buffer memory 101, and outputs color data C to frame buffer memory 102.

Frame buffer memories 101 and 102 are formed of the frame buffer memories shown in FIG. 1. Thus, the frame buffer memories having the same structure are used for the depth coordinates and color data. Frame buffer memory 101 is supplied with depth coordinate Z via image data input terminal D. Frame buffer memory 101 compares depth coordinates Z in accordance with the Z-Buffer method described before. Thus, comparing unit 8a compares depth coordinate Z stored in data bank memory 2 of frame buffer memory 101 with depth coordinate Z input through image data input terminal D, and outputs comparison result signal ZP indicative of the relationship in magnitude, i.e., difference/coincidence of these depth coordinates Z to frame buffer memory 102 via comparison result signal output terminal PASS-OUT. Frame buffer memory 102 determines whether color data C stored in data bank memory 2 can be rewritten or not in accordance with comparison result signal ZP supplied via comparison result signal input terminal PASS-IN.

As described above, frame buffer memory 101 for depth coordinate outputs the result indicative of difference/coincidence of depth coordinates Z externally from the chip via comparison result signal output terminal PASS-OUT. Frame buffer memory 102 for color data receives the comparison result signal thus output via comparison result signal input terminal PASS-IN, and inhibits the rewriting of RGB data if the result of comparison is fail (i.e., it indicates that newly input depth coordinate Z represents a position deeper than that represented by depth coordinate Z stored in data bank memory 2). As described above, each frame buffer memory is provided with comparison result signal input terminal PASS-IN and comparison result signal output terminal PASS-OUT, and the frame buffer memories of the same type can be used for depth coordinate and color data.

Figure 28:
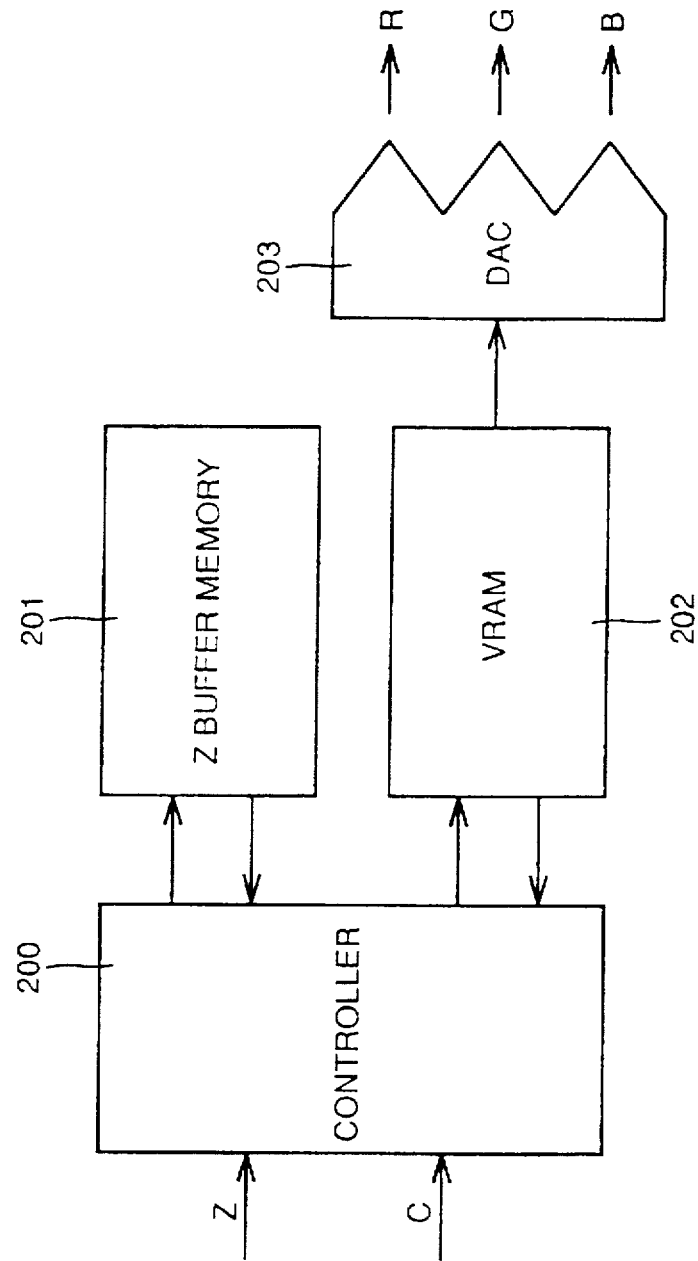
FIG. 28 shows a structure of a graphics rendering system using a conventional VRAM.
Figure 29:
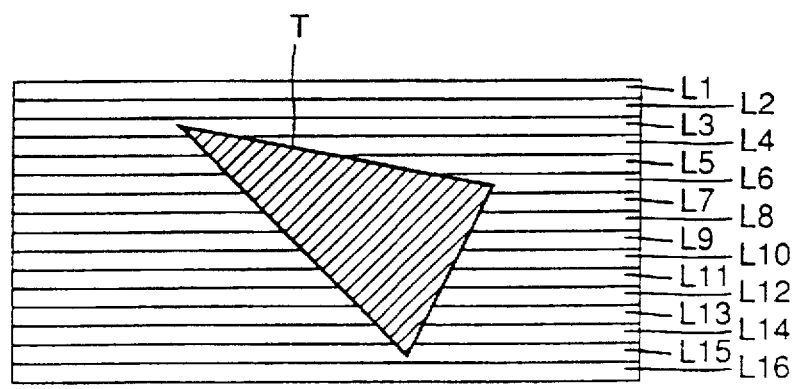
FIG. 29 is a first figure showing an example of rendering a triangle in page-divided regions using the conventional VRAM.

Since comparing unit 8a for depth coordinate Z and image processing unit 8b for color data C are arranged inside the chip, it is not necessary to output depth coordinate Z or color data C stored in data bank memory 2 of the image, which is currently rendered on the screen, externally from the chip. Although the graphics rendering system using the conventional VRAM shown in FIG. 28 causes miscosts of read and modify-write occur, i.e., two miscosts in total, only one miscost of write-only occurs in the graphics rendering system using the above frame buffer memories, and thus the number of times of access to the frame buffer memory is reduced, so that fast rewriting of image data and improvement of the rendering rate are allowed.

Figure 11:
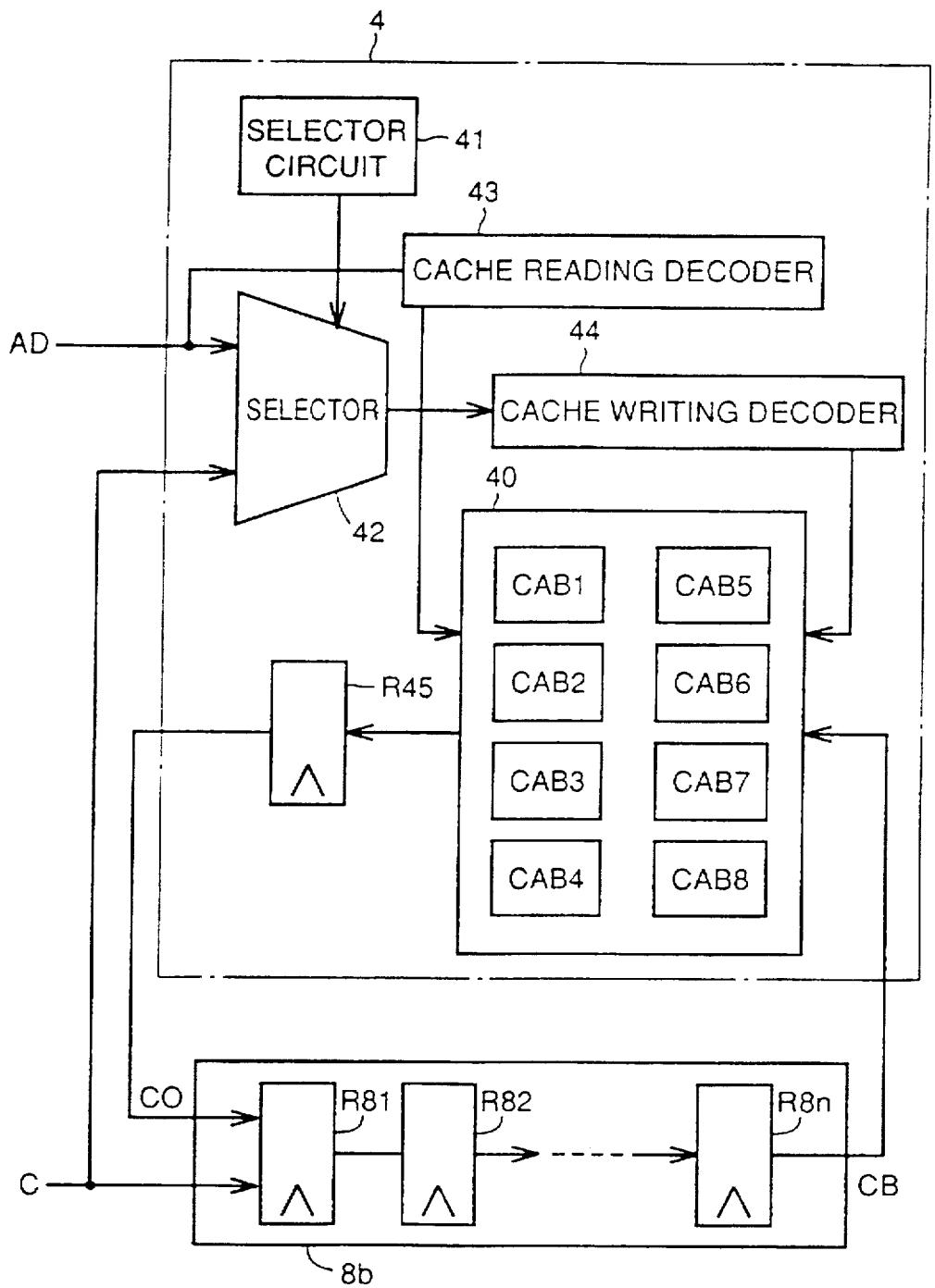
FIG. 11 is a block diagram showing a structure of a cache memory shown in FIG. 1.

Then, cache memory 4 of frame buffer memory 101 shown in FIG. 1 will be specifically described below. FIG. 11 is a block diagram showing a structure of the cache memory shown in FIG. 1.

Referring to FIG. 11, cache memory 4 includes a cache memory portion 40, a switching circuit 41, a selector 42, a cache read decoder 43, a cache write decoder 44 and a register R45. Cache memory portion 40 includes eight address blocks CAB1–CAB8 which form units of storage of the image data.

Data read from data bank memory 2 is stored at predetermined address blocks CAB1–CAB8 in cache memory portion 40. Old color data CO stored in address blocks CAB1–CAB8 is input to image processing unit 8b via register R45.

Image processing unit 8b includes a plurality of registers R81–R8n performing blending processing such as α-blending processing. Image processing unit 8b is supplied with new color data C from image data input terminals DQ0–DQ31 as described above. In image processing unit 8b, old color data CO and new color data C are blended. The data thus blended is output to cache memory portion 40, and is returned to address blocks CAB1–CAB8 having the same addresses as that from which the data was read. For example, the data read from address block CAB1 is returned to address block CAB1, and the data read from address block CAB2 is returned to address block CAB2. Naturally, the purpose of the above blending processing is rendering on the screen.

However, in such a case that the same color data as that already written into a certain address block is to be written also into another address block, remarkably wasteful operation must be performed if the data is read from data bank memory 2 via data bus DB into cache memory 4 and is returned into cache memory portion 40 via the same path as that in the aforementioned blending operation. Therefore, the cache memory shown in FIG. 11 is constructed such that the data stored in the predetermined address block can be copied into an arbitrary address block.

In general, the write address in the cache memory is the same as the read address, and the address signal sent from selector 42 via address input terminal AD is input into cache write decoder 44. Cache write decoder 44 controls cache memory portion 40 such that data is to be written into the predetermined address block in response to the address signal supplied thereto.

Meanwhile, in the copy mode, selector 42 selects the side of image data input terminals DQ0–DQ31 in response to the switching signal sent from switching circuit 41. Therefore, by inputting the write address signal via image data input terminals DQ0–DQ31, selector 42 outputs the supplied write address signal to cache write decoder 44. Cache write decoder 44 controls cache memory portion 40 such that the data is written into the predetermined address block in response to the write address signal supplied via image data input terminals DQ0–DQ31. According to the above operation, it is possible, for example, not only to return the data read from address block CAB1 to the address block CAB1 but also to copy the same to address blocks CAB2, CAB3, CAB4, . . . In this case, miscost to data bank memory 2 does not occur, and the copy can be performed only by repeating the writing within cache memory 4.

Figure 12:
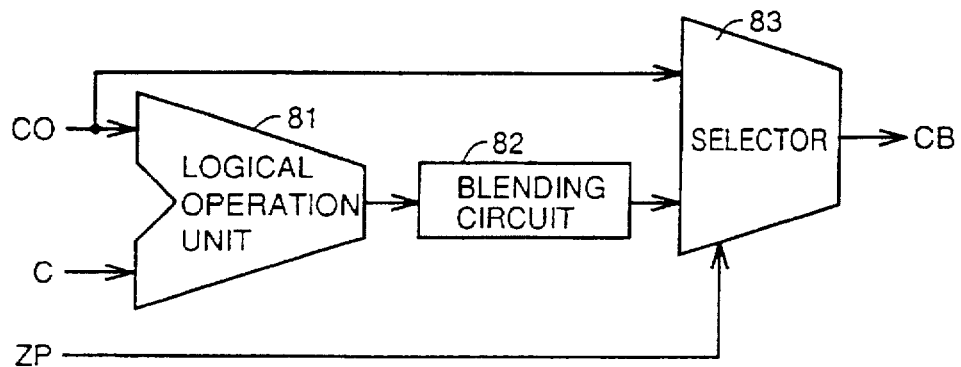
FIG. 12 is a block diagram showing a structure of an image processing unit shown in FIG. 1.

Then, image processing unit 8b in frame buffer memory 101 shown in FIG. 1 will be further specifically described below. FIG. 12 is a block diagram showing a specific structure of image processing unit 8b shown in FIG. 1.

Referring to FIG. 12, image processing unit 8b includes an operating portion 81, a blending circuit 82 and a selector 83.

Operating portion 81 is supplied with old color data CO read from data bank memory 2 and new color data C supplied via data input terminals DQ0–DQ31. Operating portion 81 performs a predetermined logical operation on supplied old color data CO and new color data C, and outputs the same to blending circuit 82. The blending circuit 82 performs predetermined blending, and outputs the blended color data to selector 83. Selector 83 is further supplied with old color data CO and comparison result signal ZP supplied via comparison result signal input terminal PASS-IN. Selector 83 selects one of the supplied old color data CO and the blended color data in accordance with comparison result signal ZP for outputting the same as color data CB. According to the above operation, it is possible in image processing unit 8b to rewrite the color data in response to comparison result signal ZP.

Figure 13:
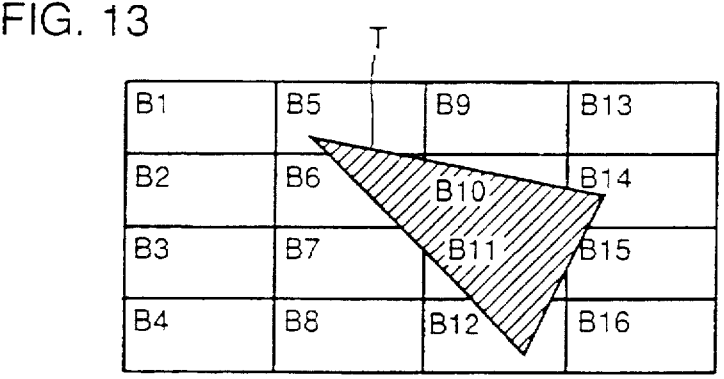
FIG. 13 is a first figure showing an example of rendering a triangle in page-divided regions with the frame buffer memory shown in FIG. 1.
Figure 14:
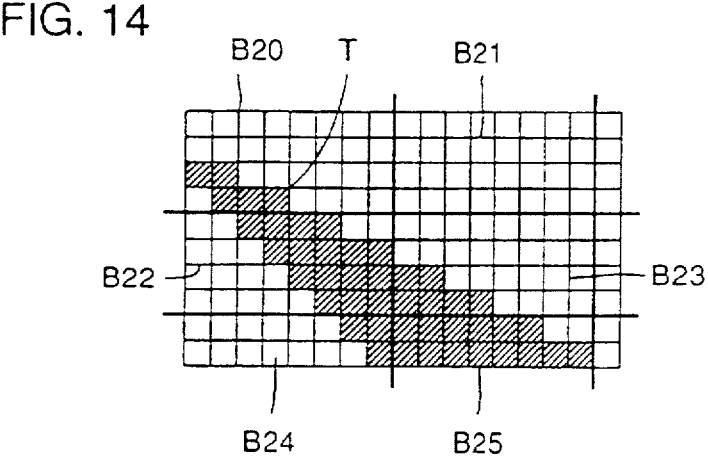
FIG. 14 is a second figure showing an example of rendering the triangle in page-divided regions with the frame buffer memory shown in FIG. 1.

Then, description will be given on a manner of rendering a triangle in page-divided regions with frame buffer memory 101 shown in FIG. 1. FIGS. 13 and 14 are first and second figures showing an example of rendering the triangle in the page-divided regions with frame buffer memory 101 shown in FIG. 1.

Although the rendering rate can be effectively improved by increasing the rate of writing data directly into DRAMs 2a–2d. However, according to the present technology, writing in the page mode requires a time of about 30 ns, and miscost corresponding to an RAS access time of about 100 ns is immediately caused if mispage occurs. Therefore, the write speed cannot be improved. Accordingly, this embodiment employs a modified structure in which the page activated in DRAMs 2a–2d has a form of multiple rows and multiple columns instead of the conventional form of one row and multiple columns.

For example, if the page in the page mode of data bank memory 2 is set to have a form consisting of blocks B1–B16 in multiple rows and multiple columns, mispage occurs eight times (blocks B5–B7, B10–B12, B14 and B15) when writing triangle T. This means that mispage can be reduced by five times as compared with the operation for the conventional page form (L1–L16) formed of one row and multiple columns causing mispage 13 times.

Figure 30:
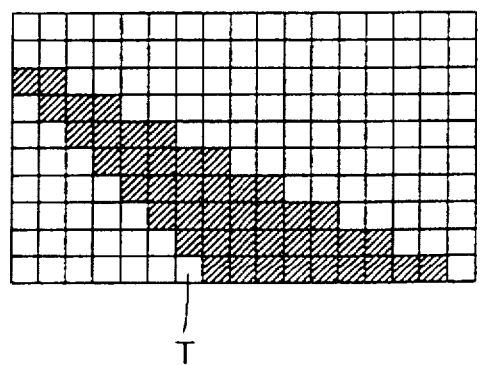
FIG. 30 is a second figure showing the example of rendering the triangle in the page-divided regions using the conventional VRAM.

If the write unit of the page mode is, for example, a rectangular block form of 4 rows and 8 columns as shown in FIG. 14, triangle T can be written by performing the page mode write 5 times, i.e., in blocks B20, B22, B23, B24 and B25. Meanwhile, in the conventional VRAM shown in FIG. 30, the page mode write must be performed 44 times, and thus the above embodiment can reduce the number of times of page mode write by 39.

Figure 15:
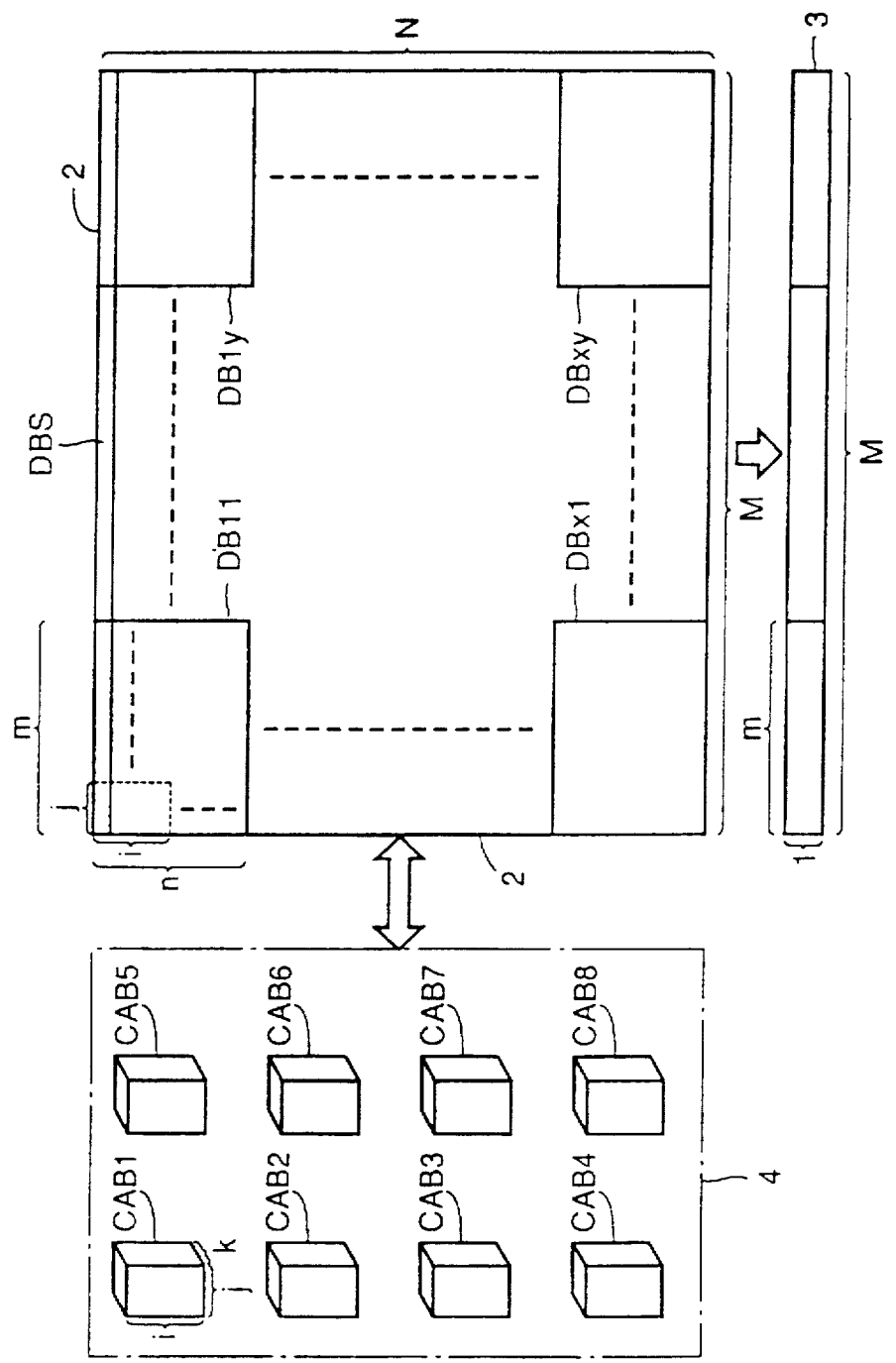
FIG. 15 shows a relationship between storage regions of the data bank memory, cache memory and serial access memory shown in FIG. 1.

Description will now be given on the relationship between storage regions of data bank memory, cache memory and serial access memory in the above frame buffer memory. FIG. 15 shows the relationship between the storage regions of data bank memory 2, cache memory 4 and serial access memory 5 in the frame buffer memory shown in FIG. 1.

First, relationship between data bank memory 2 and cache memory 4 will be described below. Referring to FIG. 15, data bank memory 2 has the storage regions in N rows and M columns. The storage regions in N rows and M columns correspond to one plane of the screen. In the first page mode for performing writing/reading between cache memory 4 and data bank memory 2, data bank memory 2 has a page size of n rows and m columns. For example, the form of data block DB11 is activated. The storage region of data bank memory 2 is divided into y in the row direction (lateral direction in the figure), and is divided into x in the column direction (longitudinal direction in the figure). Each of data blocks DB11, . . . , DB1y, . . . , DBx1, . . . , DBxy is activated in the page mode. This activation of page means that data of memory cells in DRAMs 2a–2d of data bank memory 2 is read to sense amplifiers for allowing external writing. In this case, the above activation means that writing/reading with respect to cache memory 4 is allowed. Data block DB11 is divided, for example, into 40, and performs data transference a group at a time with respect to cache memory 4, the group consisting of 8 storage regions in i rows and j columns. For example, assuming that the writing unit in the page mode is a rectangular block of 4 rows × 8 columns × 8 planes, data of 256 bits is to be transferred, and thus data bus DB has a bus width of 256 bits. Meanwhile, each of address blocks CAB1–CAB2 in cache memory 4 has a storage region of i rows, j columns and k planes. Therefore, when writing/reading between cache memory 4 and data bank memory 2 is to be performed, the page form of n rows and m columns is activated. If the write unit in the page mode is a rectangular block of i rows, j columns and k planes, the direct data transference can be performed a rectangular block at a time, and the efficiency of data transference can be improved.

Operation for transferring data from data bank memory 2 to serial access memory 3 will be described below. Serial access memory 3 has storage regions for one row in the screen, i.e., storage regions in one row and M columns so that the CRT displaying the image data output from the frame buffer memory can be successively scanned a row at a time. Therefore, even if the page form of n rows and m columns were activated as described before, only data for one row among them would be required, so that the power would be wastefully consumed and the access time would increase. For this reason, the data bank memory 2 of this embodiment has a second page mode for activating the page form of one row and M columns in data bank memory 2 when data is transferred from data bank memory 2 to serial access memory 3. Therefore, the activated page form fits the form of storage regions of serial access memory 3, so that data is not wastefully transferred, and data can be transferred highly efficiently.

Figure 16:
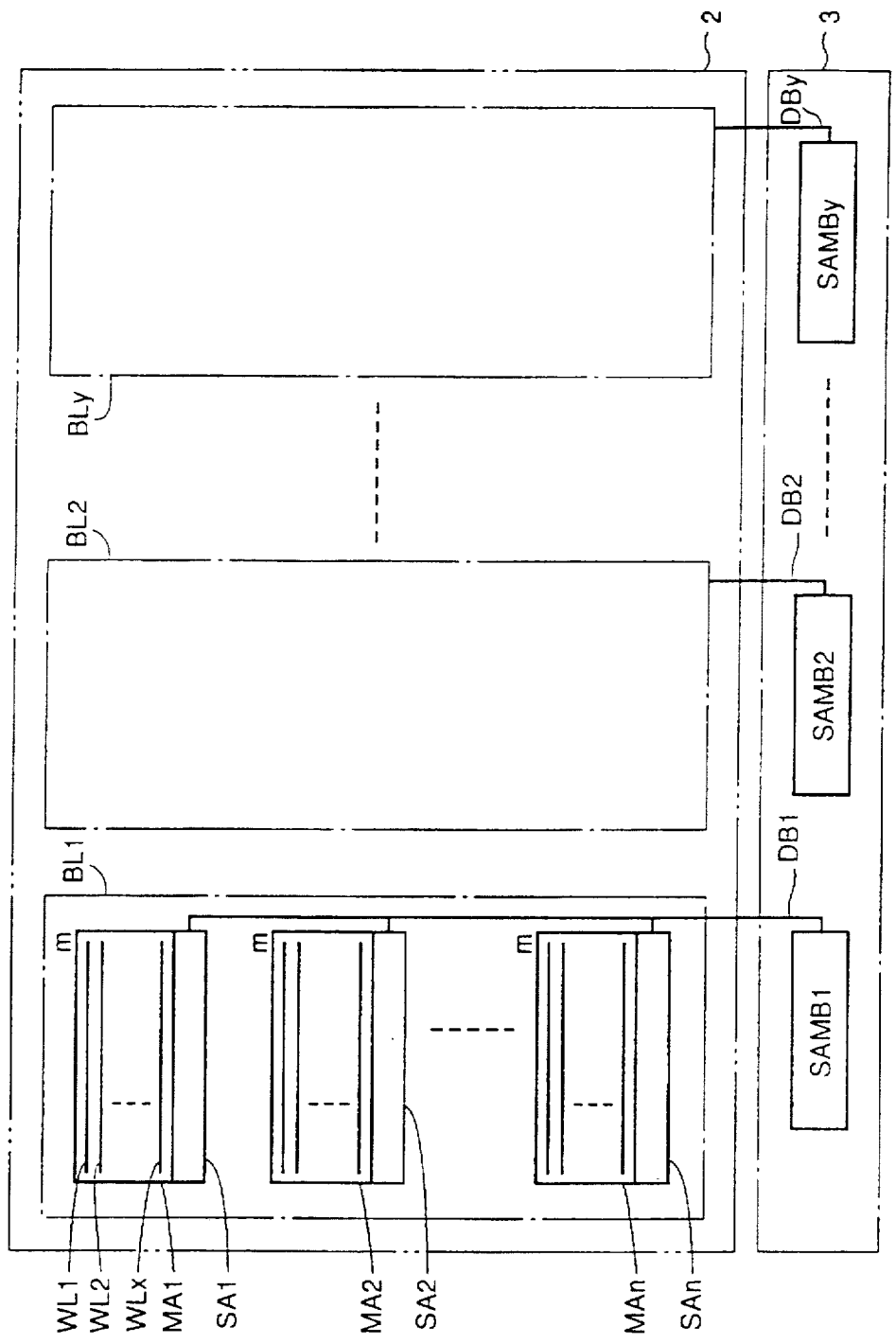
FIG. 16 is a block diagram showing a structure of the data bank memory shown in FIG. 1.

Then, a structure of data bank memory 2 will be specifically described below. FIG. 16 is a block diagram showing a structure of data bank memory 2 shown in FIG. 1.

Referring to FIG. 16, data bank memory 2 includes a plurality of blocks BL1–BLy. Each of blocks BL1–BLy includes memory cell arrays MA1–MAn and sense amplifiers SA1–SAn. Serial access memory 3 includes a plurality of serial access memory blocks SAMB1–SAMBy.

Memory cell array MA1 includes row select lines WL1–WLx which are x in number. Memory cell array MA1 has storage regions in x rows and m columns. Other memory cell arrays MA2–MAx have the same structure. For example, row select line WL1 in each memory cell array forms data block DB11 shown in FIG. 15. Sense amplifier SA1 amplifies data of the memory cells of the selected row select line for outputting the same to the data bus. Other sense amplifiers SA2–SAx operate in the same manner. Data bus DB1 selects one of sense amplifiers SA1–SAx for outputting the data thereof to serial access memory block SAMB1. Other data buses DB2–DBy operate in the same manner. Serial access memory block SAMB1 has storage regions in one row and m columns corresponding to the data for one row read from memory cell arrays MA1–MAn. Other blocks BL2–BLy have the same structure and function.

A relationship of data of data bank memory on the screen will be described below. FIG. 17 shows a form of data of the data bank memory on the screen.

Referring to FIG. 17, each of blocks BL1–BLy shown in FIG. 16 corresponds to a rectangle of N (=n·x) rows and m columns on the screen. More specifically, blocks BL1–BLy are each developed in the column direction to form an image plane of N columns and M (=m·y) rows as a whole. Writing/reading with respect to cache memory 4 are performed as follows. In the first page mode for reading data from data bank memory 2 to cache memory 4, predetermined row select lines WL included in all memory cell arrays MA1–MAn which are contained in a predetermined block among blocks BL1–BLy are activated. For example, n row select lines WL1 in memory cell arrays MA1–MAn in block BL1 and corresponding sense amplifiers SA1–SAn are activated, and corresponding data is transmitted from sense amplifiers SA1–SAn via data bus DB1. The data thus transmitted corresponds to the rectangle of n rows and m columns at an upper left position in the screen. The same is true with respect to the other regions on the screen. According to the above operation, data corresponding to the predetermined region on the screen is transferred to cache memory 4.

Figure 18:
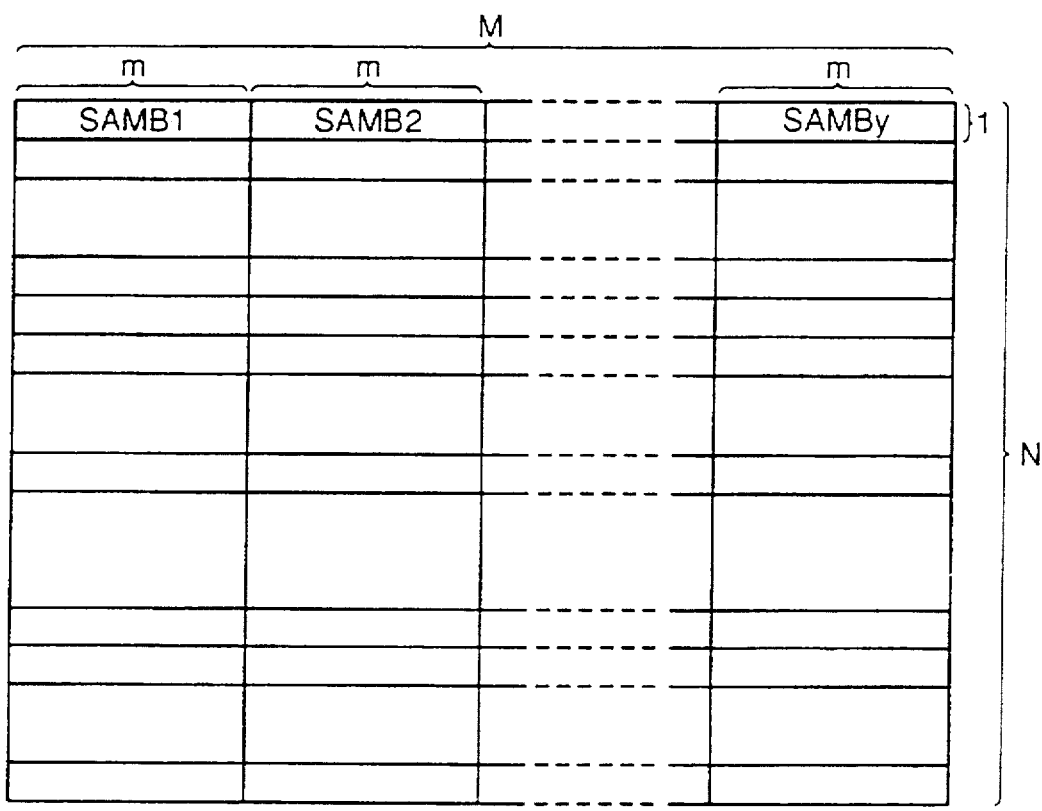
FIG. 18 shows correspondence between data of serial access memory on the screen.

Then, relationship of data of the serial access memories on the screen will be described below. FIG. 18 shows the relationship of data of the serial access memories on the screen.

In the second page mode for reading data from data bank memory 2 to serial access memory 3, a page form corresponding to one specific row on the screen is activated. For example, it is assumed that the uppermost row on the screen is read from serial access memory 3. Data in the data bank memory 2 corresponding to the uppermost row on the screen is stored in the memory cells selected by the row select line WL1 in each memory cell array MA1 in blocks BL1–BLy. Therefore, the operation of reading data from data bank memory 2 to serial access memory 3 can be performed in such a manner that word lines WL1 in memory cell arrays MA1 in blocks BL1–BLy are activated, and data read to the respective sense amplifiers SA1 are read to the corresponding serial access memory blocks SAMB1–SAMBy via data buses. In this operation, memory cell arrays MA2–MAx in the respective blocks BL1–BLy are not activated, which is different from the operation during access to cache memory 4, so that wasteful current consumption can be suppressed.

As described above, different manners of selecting the row select line are employed for the cases that data bank memory 2 is accessed from cache memory 4 and that data bank memory 2 is accessed from serial access memory 3, whereby it is possible to activate the optimum page form for the respective memory structures of cache memory 4 and serial access memory 3. As a result, it is possible to suppress lowering of the efficiency of data transfer which may be caused by the mispage during reading/writing, and it is possible to prevent activation of unnecessary row select lines and unnecessary sense amplifiers, whereby the current consumption during each operation can be reduced.

In this embodiment, as described above, the page form of data bank memory 2 is set to n rows and m columns when writing/reading data with respect to cache memory 4 including the memory block of i rows, j columns and k planes. Also, the page form is set to one row and M columns when reading data to serial access memory 3 including the memory block of one row and m columns. Therefore, it is possible to optimize the page form of the data bank memory in accordance with the structure of the memory cell from or to which data is to be read or written, so that reading/writing can be performed highly efficiently with respect to different memories, and fast rewriting of image data and improvement of a rendering rate can be achieved. The above embodiment has been described in connection with case where the memory block of cache memory 4 is the three-dimensional block of i rows, j columns and k planes. However, the invention can be also applied to the case where it is a two-dimensional block.

Figure 19:
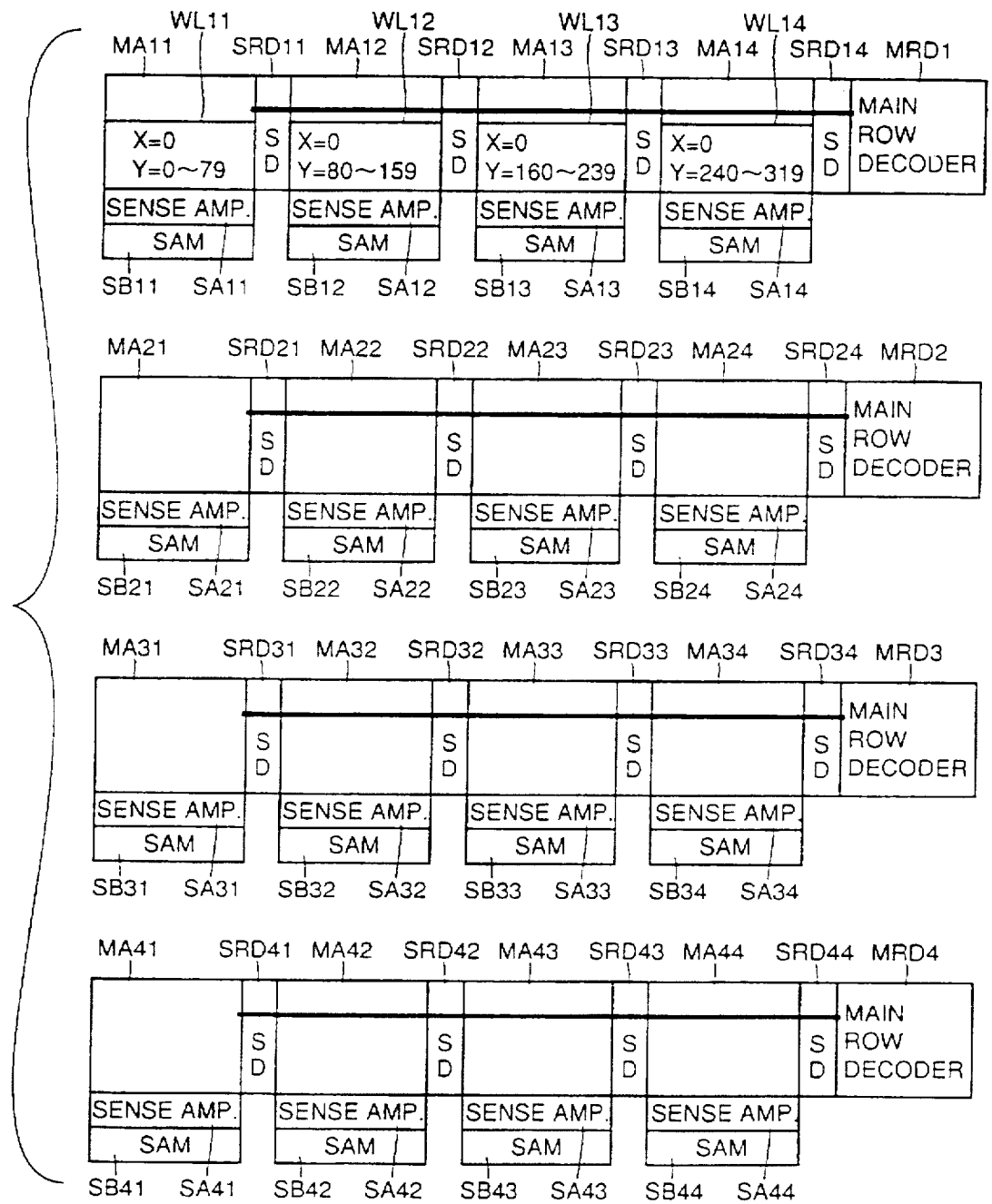
FIG. 19 shows a first page mode.

A further specific structure of data bank memory 2 will be described below. FIG. 19 is a block diagram showing a portion of the structure of DRAMs 2a–2b in data bank memory 2 shown in FIG. 1.

Referring to FIG. 19, data bank memory 2 includes memory cell arrays MA11–MA44, row sub-decoders (SD) SRAD11–SRD44, main row decoders MRD1–MRD4, and sense amplifiers SA11–SA44. Serial access memory 3 includes a plurality of serial access memory blocks (SAM) SB11–SB44.

In the first page mode, for example, main decoder MRD1 outputs an activation signal, and row sub-decoder SRD11 outputs an activation signal, so that row select line WL11 is activated. Therefore, data of addresses X=0 and Y=0–79, becomes readable. Thereafter, main row decoders MRD2–MRD4 and row sub-decoders SRD21, SRD31 and SRD41 output activation signals to activate row select lines WL21, WL31 and WL41, respectively. Therefore, in the first page mode, a rectangular page of 4×80=320 bits is activated. Since the actual data bank memory 2 includes blocks which are four time as many as those shown in FIG. 20, the rectangular page of 16×80=1280 bits is activated. As a result, such a storage region of the data bank memory is activated that corresponds to a region formed by dividing the screen formed of 1280 pixels in the lateral direction and 1024 pixels in the longitudinal direction into seven portions in the lateral direction and 32 portions in the longitudinal direction.

Figure 20:
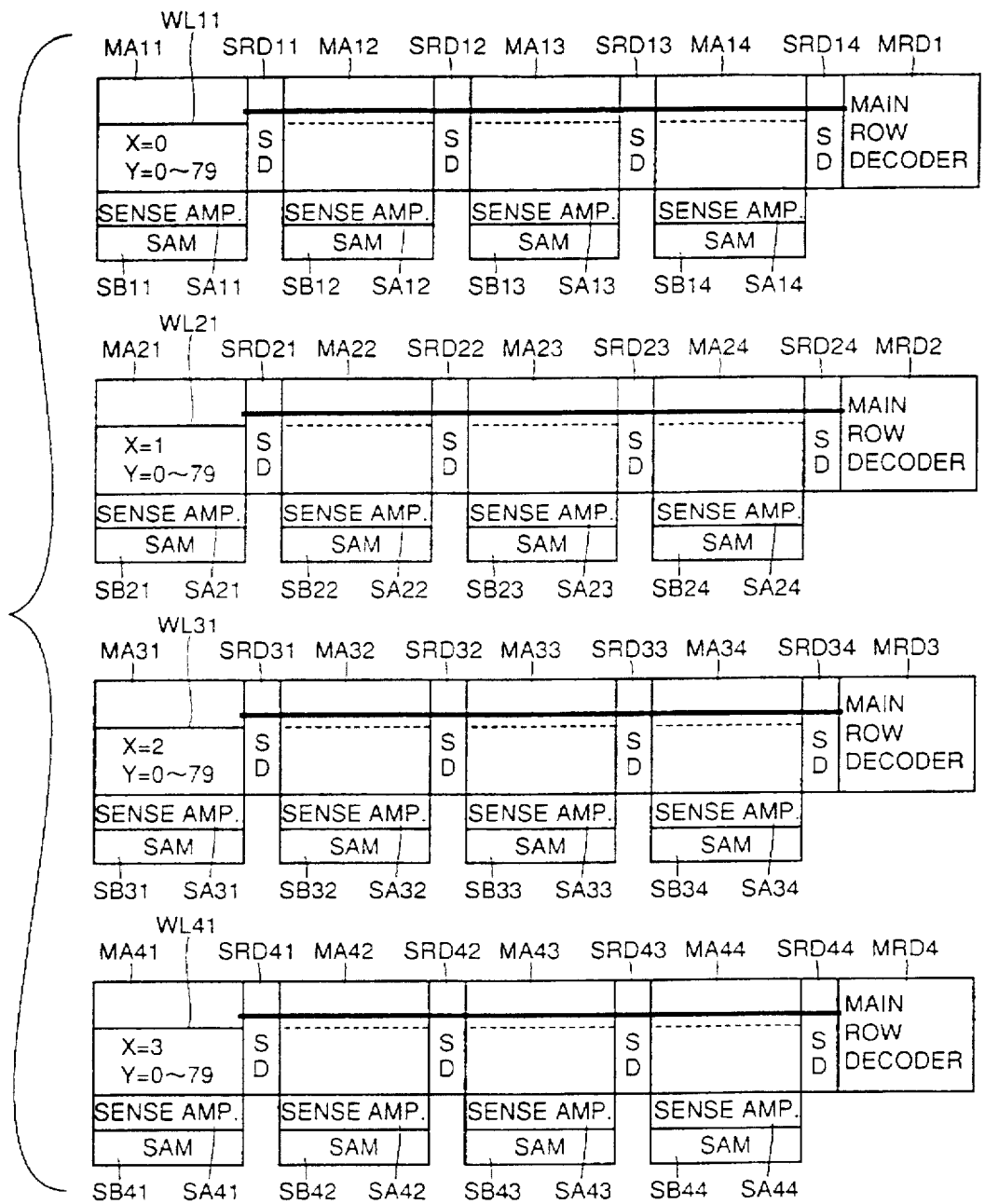
FIG. 20 shows a second page mode.

Then, the second page mode will be described below. FIG. 20 is a diagram for showing the second page mode.

Referring to FIG. 20, in the second page mode, main row decoder (e.g., MRD1) outputs an activation signal, and row sub-decoders SRD11–SRD14 output activation signals. Therefore, row select lines WL11–WL14 are activated to allow reading of data. As a result, a line-shaped page form of one row and 320 columns is activated. Similarly to the above, the data bank memory is provided with blocks which are four times as many as those shown in FIG. 20, so that a line-shaped page of one row and 1280 columns is ultimately activated. This form corresponds to the data for one line of the screen formed of 1280 pixels in the lateral direction and 1024 pixels in the longitudinal direction, and the data is stored in serial access memory blocks SB11–SB14.

In the first page mode, as described above, the rectangular page form of 16 rows and 80 columns is activated, and it is possible to reduce the number of times of access during transference of data between cache memory 4 and data bank memory 2. Since the line-shaped page form of one row and 1280 columns is activated in the second page mode, it fits the form of storage region of serial access memory 3, so that useless data is not transferred, and data can be transferred highly efficiently.

Figure 21:
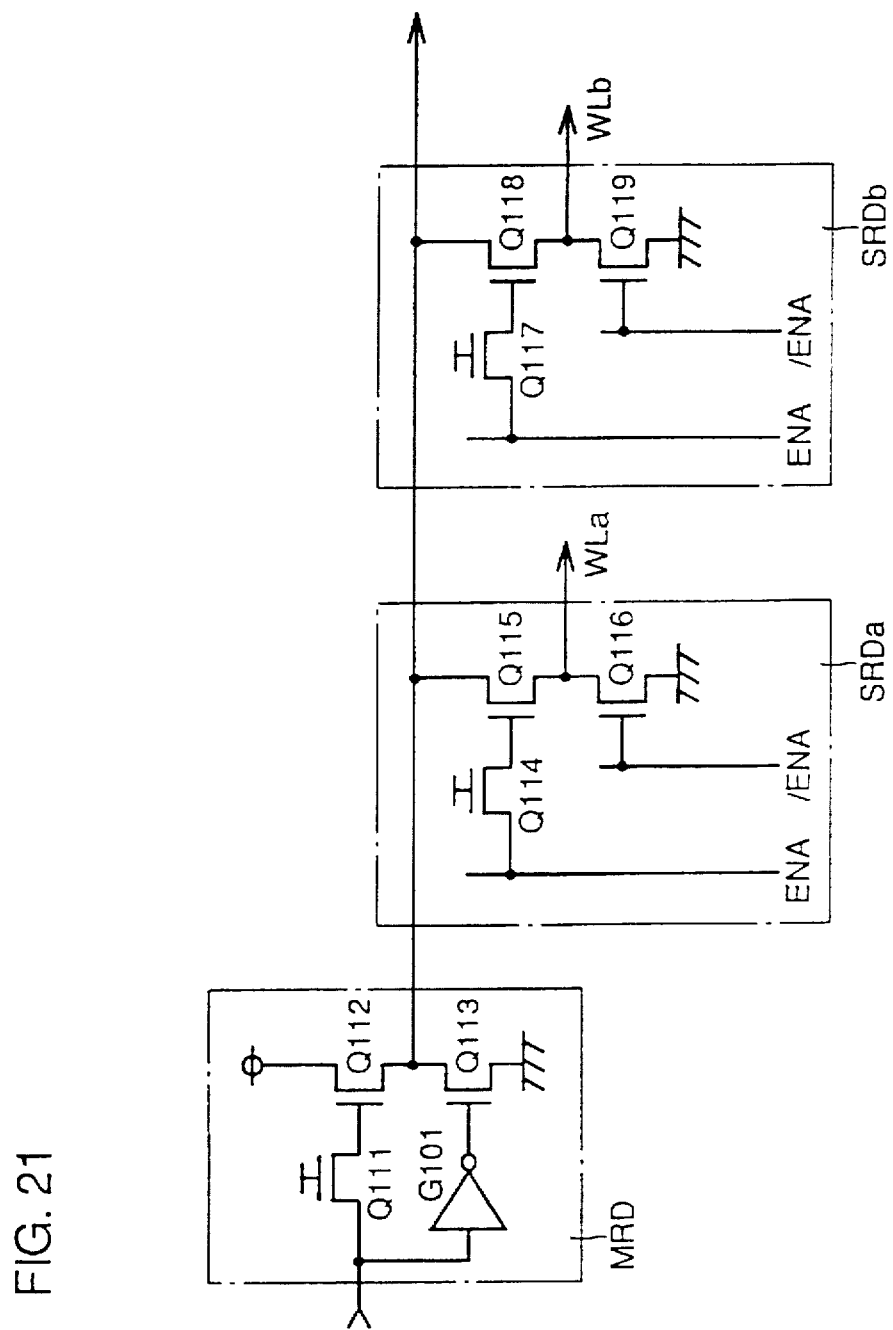
FIG. 21 shows a structure of a main row decoder and a row sub-decoder shown in FIGS. 19 and 20, respectively.

Structures of the main row decoders and row sub-decoders shown in FIGS. 19 and 20 will be described below. FIG. 21 shows the structures of main row decoders MRD and row sub-decoders SRDa, . . . shown in FIGS. 19 and 20. Although FIG. 21 shows only two sub-decoders for simplicity reason, the following structure can be employed also in the case where four row sub-decoders SRD11–SRD14 or the like are used as shown in FIGS. 19 and 20.

Referring to FIG. 21, main row decoder MRD includes NMOS transistors Q111–Q113 and an inverter G101. Transistors Q111 and Q113 are connected in series between the ground potential and power supply voltage Vcc. Inverter G101 is connected to the gate of transistor Q113. A gate of transistor Q112 is connected to transistor Q111.

Row sub-decoder SRDa includes NMOS transistors Q114–Q116. Transistors Q115 and Q116 are connected in series between the ground potential and an output line of main row decoder MRD. Transistor Q115 receives on its gate an enable signal ENA via transistor Q114. Transistor Q116 receives on its gate an enable signal /ENA complementary to enable signal ENA. A connection between transistors Q115 and Q116 is connected to word line WL. Row sub-decoder SRDb has the same structure as row sub-decoder SRDa.

According to the above structure, when main row decoder MRD receives a control signal at the state of "H", transistor Q112 is turned on, and main row decoder MRD outputs the activation signal at power supply voltage Vcc level to row sub-decoders SRDa and SRDb. Therefore, when row sub-decoder SRDa receives enable signal ENA at the "H" level, transistor Q115 is turned on to activate row select line WL. As described above, by carrying out the logical AND between the activation signal sent from main row decoder MRD and the activation signal sent from row sub-decoder SRDa, only a predetermined word line in the memory cell array can be activated. Therefore, by activating only an intended row sub-decoder among a plurality of row sub-decoders SRDa, . . . connected to one main row decoder MRD, a line-shaped page can be activated, or a rectangular page can be activated. Thus, in the first page mode, the same enable signals ENA and /ENA are input to row sub-decoders SRDa and SRDb. In the second page mode, different enable signals ENA and /ENA are input to them. Thereby, the page of a desired form can be activated.

Then, dirty tag memory 6 shown in FIG. 1 will be described below. As described above, if writing in the page mode during transference of data between cache memory 4 and data bank memory 2 were performed a rectangular block, which is of 4 rows, 8 columns and 8 planes, at a time and the bus width of data bus DB were 256 bits, the power consumed during the page mode writing would be about ten times as large as that of the conventional VRAM, and thus it would be impossible to improve the rendering rate in view of the maximum allowable power of the chip. In this embodiment, however, dirty tag memory 6 which will be described below is used for reducing the power consumption.

Figure 22:
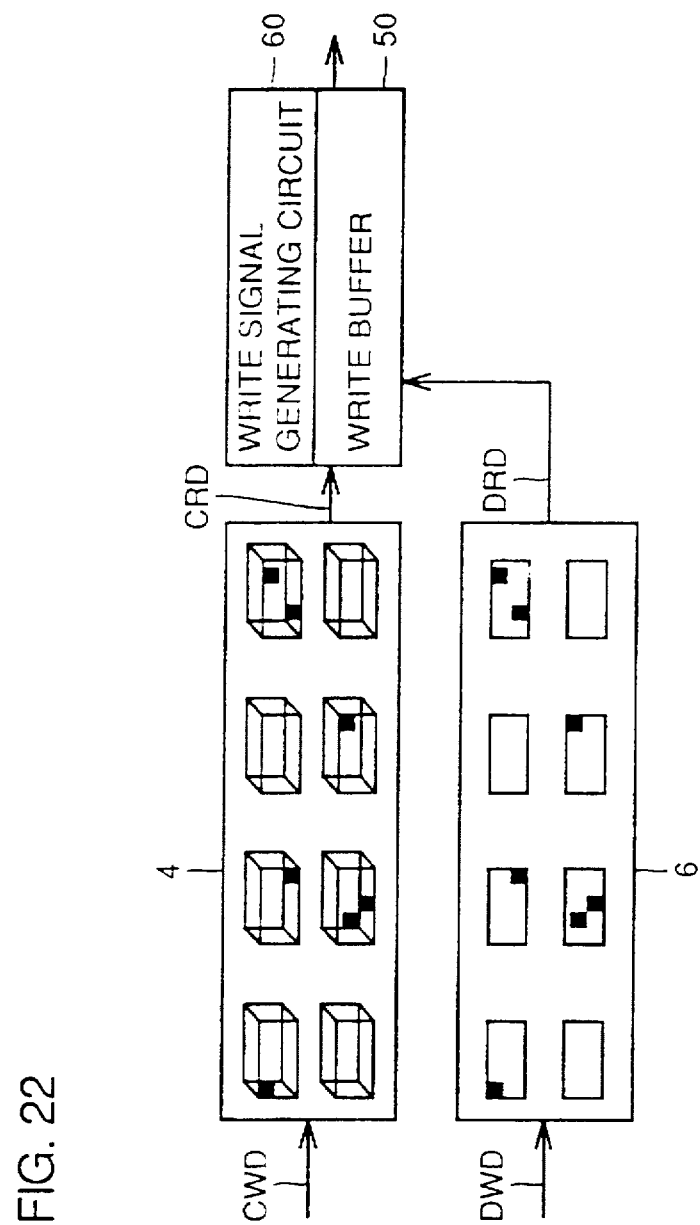
FIG. 22 is a block diagram showing operation of a dirty tag memory shown in FIG. 1.

For example, in triangle T shown in FIG. 14, the bytes, which require actual writing, in the rectangular blocks of 4 rows and 8 columns (32 bytes in total) are 5 bytes in block B20, 0 byte in block 21 and 16 bytes in block B22. Therefore, data transfer buffer 5 may be controlled to perform the writing in such a manner that only the bytes of which writing is actually performed are written into data bank memory 2, whereby it is possible to minimize the required power consumption during the page mode writing. Now, description will be given on the method of detecting the bytes, of which writing is actually performed, with dirty tag memory 6. FIG. 22 is a flow chart showing operation of the dirty tag memory shown in FIG. 1.

Referring to FIG. 22, when data is to be written into cache memory 4, data is simultaneously written into the respective memories via write data line CWD of cache memory 4 and write data line DWD of dirty tag memory 6. Accordingly, when data is written into each address block of cache memory 4 (solid squares in FIG. 22 represent the memory cells containing written data), data is similarly written into the corresponding memory cell of the address block in dirty tag memory 6 (solid squares in FIG. 22 represent the memory cells containing written data). In FIG. 22, one plane of 4 rows and 8 columns which is one address block in dirty tag memory 6 corresponds to 8 planes of 4 rows and 8 columns which are one address block in cache memory 4. The reason for this is as follows. According to R-, G- and B-data to be written into cache memory 4, each data for one pixel is represented by 8 bits, so that, when one pixel is rewritten, one data is necessarily rewritten, and all the data for 8 bits is rewritten.

When data is read from cache memory 4 via a data line CRD into a write buffer 50 arranged in data transfer buffer 5 shown in FIG. 1, corresponding data in dirty tag memory 6 is read into write buffer 5 via data line DRD. Write buffer 5 responds to the write enable signal sent from write signal generating circuit 60 by transferring data read from cache memory 4 only when data read from dirty tag memory 6 is of a predetermined value of, e.g., "1".

Figure 23:
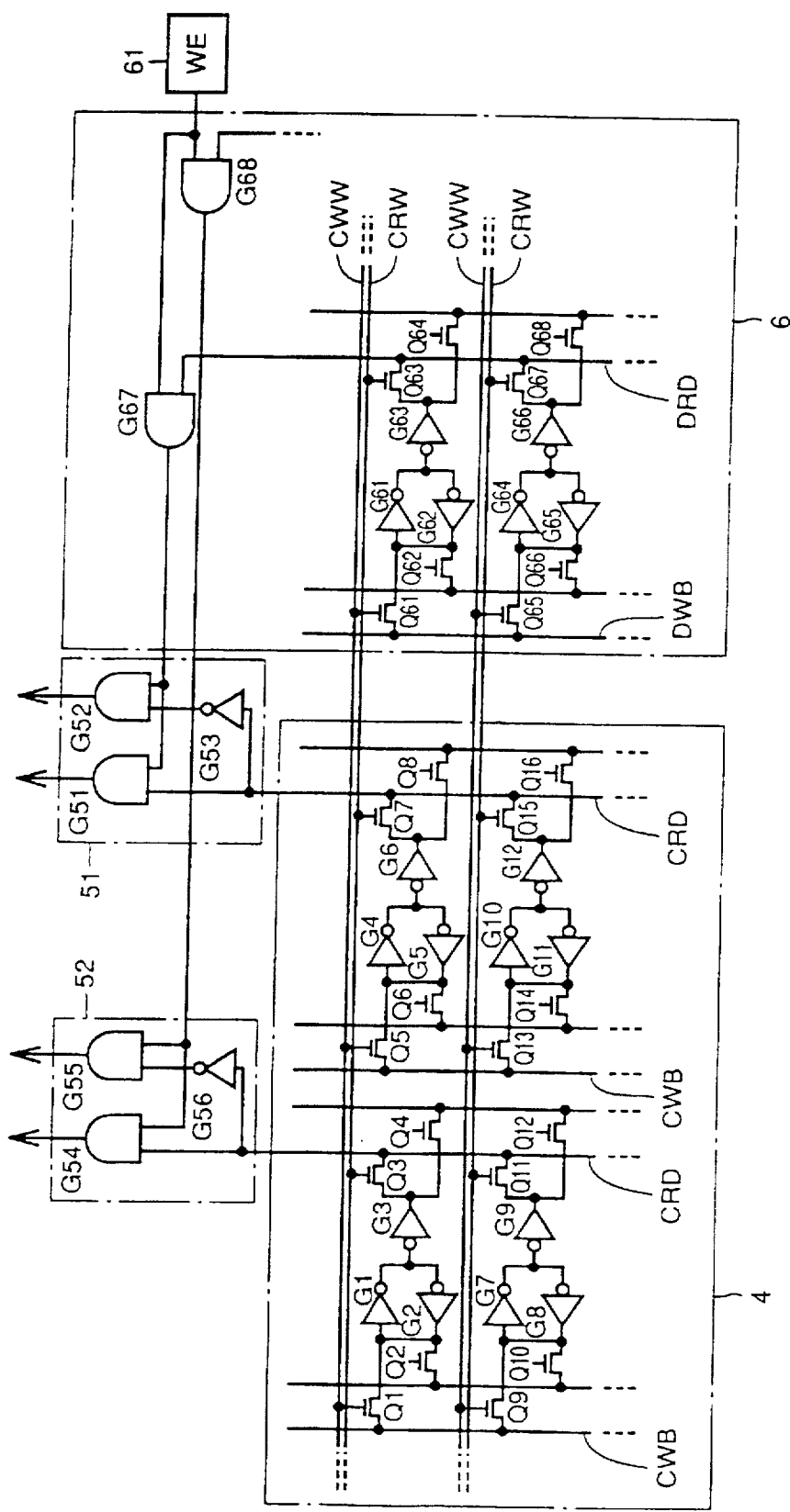
FIG. 23 is a circuit diagram showing a peripheral structure of the dirty tag memory shown in FIG. 1.
Figure 24:
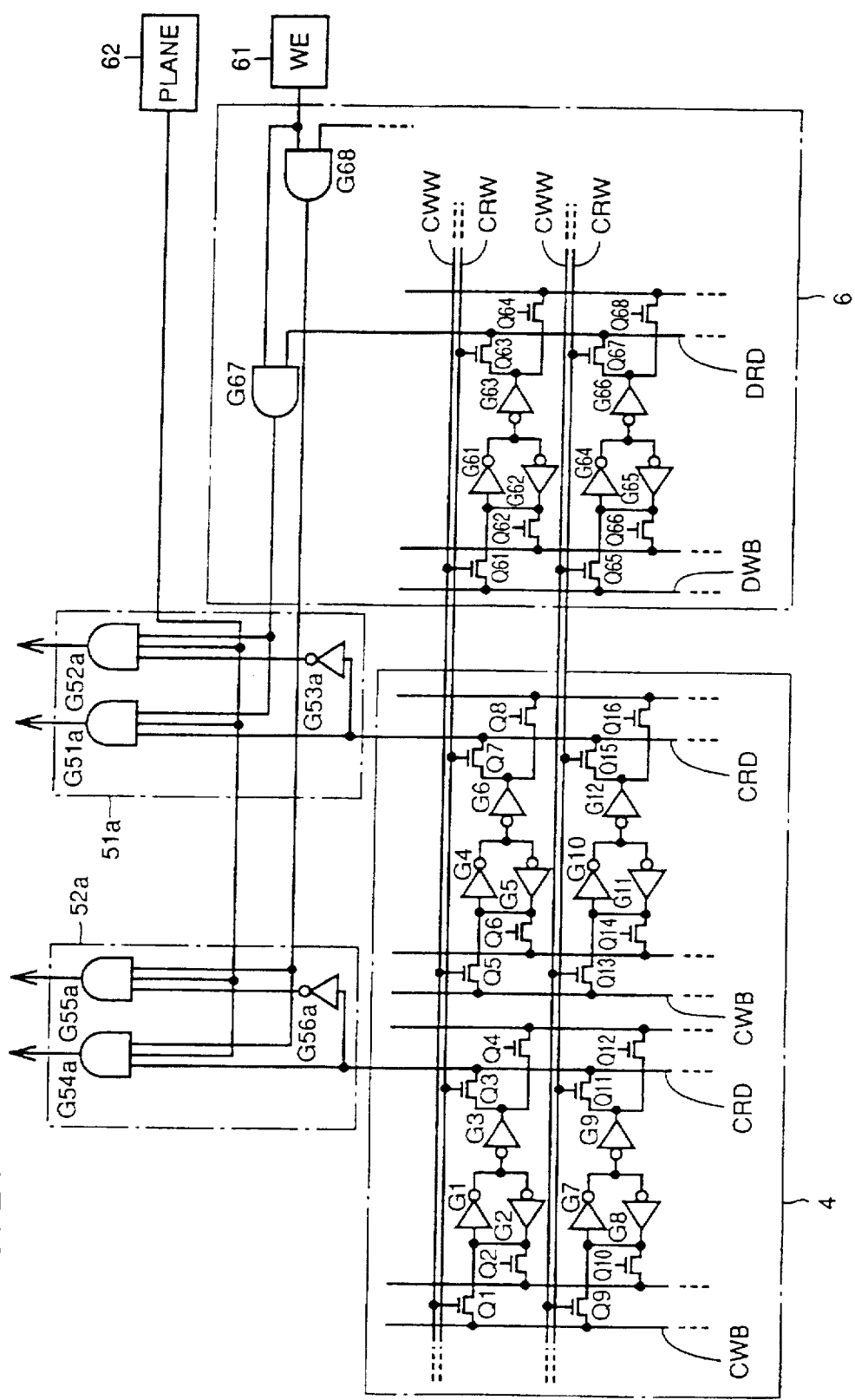
FIG. 24 shows another specific peripheral structure of the dirty tag memory shown in FIG. 1.

Then, a more specific structure of dirty tag memory 6 shown in FIG. 1 will be described below. FIG. 23 is a circuit diagram showing a peripheral structure of dirty tag memory 6 shown in FIG. 1. FIG. 23 shows only portions of respective circuits for showing operation of dirty tag memory 6.

Referring to FIG. 23, cache memory 4 includes NMOS transistors Q1–Q16 and inverters G1–G12. Transistor Q1 is connected to a read bit line CWB and inverters G1 and G2. Inverters G1 and G2 are connected to an inverter G3. Inverters G1–G3 form one memory cell. Inverter G3 is connected to transistors Q3 and Q4. Transistor Q3 is connected to read bit line CRD. Transistor Q2 is connected to inverters G1 and G2. A gate of transistor Q1 is connected to a write word line CWW. A gate of transistor Q3 is connected to a read word line CRW. Other transistors Q5–Q16 and inverters G4–G12 are connected in the same manner as the above.

Dirty tag memory 6 includes AND gates G67 and G68, NMOS transistors Q61–Q68 and inverters G61–G66. Transistor Q61 is connected to write bit line DWB and inverters G61 and G62. Inverters G61 and G62 are connected to inverter G63. Inverter G63 is connected to transistors Q63 and Q64. Transistor Q63 is connected to read data line DRD. Transistor Q62 is connected to inverters G61 and G62. A gate of transistor Q61 is connected to write word line CWW. A gate of transistor Q63 is connected to read word line CRW.

According to the above structure, write word line CWW is commonly used by cache memory 4 and dirty tag memory 6. Therefore, when data of "0" or "1" is written into a predetermined memory cell in cache memory 4, data of "1" can be written into the corresponding memory cell in dirty tag memory 6. Therefore, when the data of "1" of the memory cell in dirty tag memory 6 is "1", data is written into the corresponding memory cell in cache memory 4, so that the memory cell in the cache memory 4 on which writing is performed can be detected by detecting the data of dirty tag memory 6.

Meanwhile, AND gate G67 receives the signal of read data line DRD of dirty tag memory 6 and write enable signal (WE) 61. Inverter G67 outputs the data of "1" to write buffer 51 only when write enable signal 61 is "1" and data of read data line DRD is "1". AND gate G68 operates in a similar manner.

Write buffer 51 includes AND gates G51 and G52, and an inverter G53. Each of write buffers 51 and 52 is provided correspondingly to one column in cache memory 4. AND gate G51 and inverter G53 are connected to transistor Q7 via read data line CRD. Inverter G53 is connected to AND gate G52. AND gates G51 and G52 are connected to AND gate G67. According to the above structure, when AND gate G67 outputs data of "1", write buffer 51 is driven, and data input via transistor Q7 is output from AND gates G51 or G52 and is transmitted to data bus DB. In the case other than the above, write buffer 51 is not driven, and data is not transmitted to data bus DB. Write buffer 52 operates in a similar manner.

According to the above operation, when data is written into the memory cell in cache memory 4, data of "1" is written into the corresponding memory cell in dirty tag memory 6, and write buffer 51 is driven only when the data of memory cell in dirty tag memory 6 is "1", so that data of the memory cell in cache memory 4, on which writing is performed, is output to data bus DB. Therefore, data of cache memory 4 other than the above written data is not output to data bus DB, so that the required power consumption can be minimized during page mode writing.

The above embodiment may be provided with the above mask function corresponding in the plane direction to all the R-, G- and B-data, and in other words, the above mask function may be executed not on only 8 planes but on 24 planes, i.e., all the R-, G- and B-data, whereby the power consumption during the page writing can be further reduced.

FIG. 23 shows a peripheral structure of the dirty tag memory additionally provided with the mask function in the plane direction. FIG. 23 differs from FIG. 22 in that write buffers 51 and 52 are replaced with write buffers 51a and 52a including 3-input AND gates G51a, G52a, G54a and G55a, and each of AND gates G51a, G52a, G54a and G55a is newly supplied with a plane signal (PLANE) 62. Other structures are the same as those shown in FIG. 23, and thus will not be described below. The above structure can perform masking also in the plane direction in accordance with plane signal 61, and the power consumption during the page writing can be further reduced.

Then, data sent from serial access memories 3a and 3b will be described below. This embodiment is constructed such that, as shown in FIG. 1, the serial access memory is divided into two memories, i.e., serial access memories 3a and 3b, which alternately receive data transmitted from DRAMs 2a–2d, so that color data can be output without interrupting data. Usually, the output of color data is formed of R-, G- and B-data each consisting of 8 bits, and hence is the data of 24 bits in total. When the double buffer structure is employed as described above, data of 1 byte is additionally required for buffering, and it is desirable to output 32 bits in total from video output terminal VO at a time. However, provision of 24 or 32 video output pins for one frame buffer memory increases the chip area, and causes problems of increase of power consumption during outputting and others.

Accordingly, this embodiment is provided with video output terminal VO having 16 pins. In this case, data of two bytes, i.e., X-data of 1 byte (for buffering) and R-data of 1 byte is output during one cycle of clock signal VC, and G-data of 1 byte and B-data of 1 byte (i.e., data of 2 bytes in total) are alternately output during subsequent one cycle. In this case, data output from video output terminal VO is constructed such that output of color data for one pixel requires two cycles, and attention must be given to input of even number or odd number of the video clock signals. This embodiment is provided with video output switching circuit 7 which will be described below, so that data of 2 bytes including X-data and R-data as well as data of 2 bytes including G-data and B-data can be output in the switched order.

Figure 25:
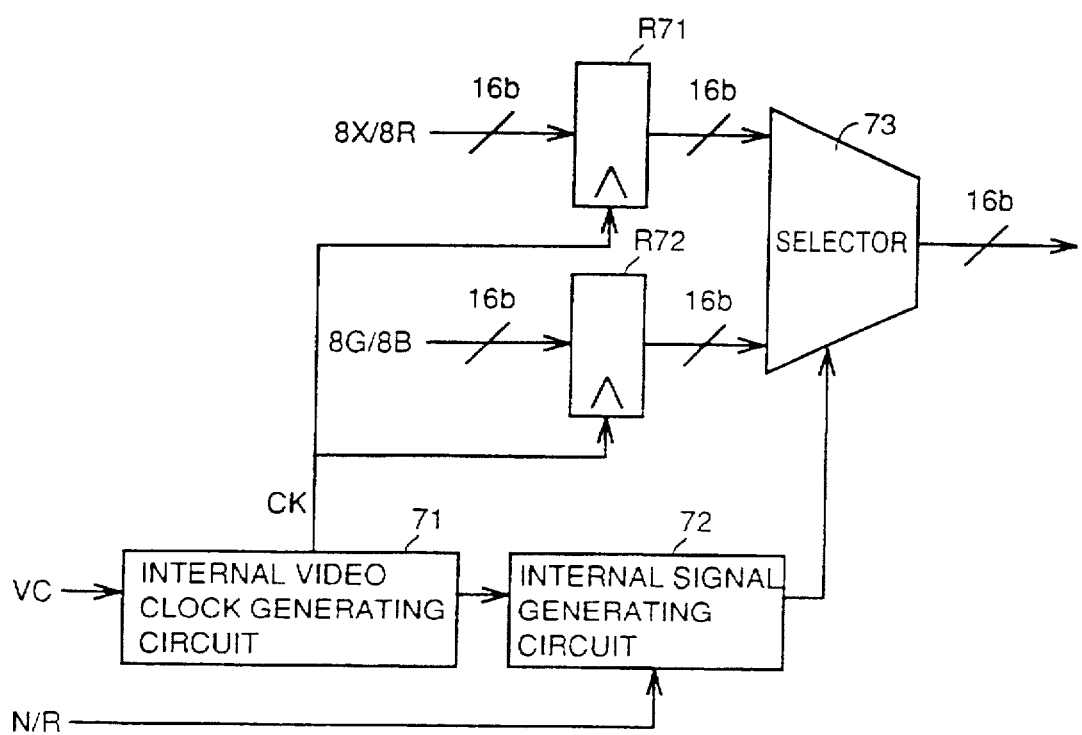
FIG. 25 is a block diagram showing a structure of a video output switching circuit shown in FIG. 1.
Figure 26A:
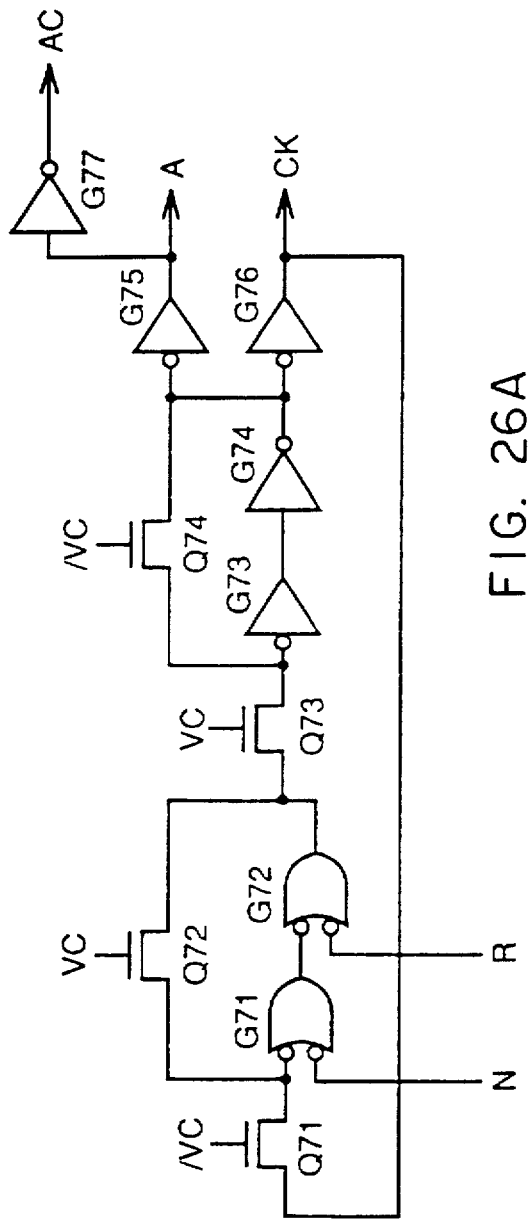
FIG. 26 is a circuit diagram showing a specific structure of the video output switching circuit shown in FIG. 25.
Figure 26B:
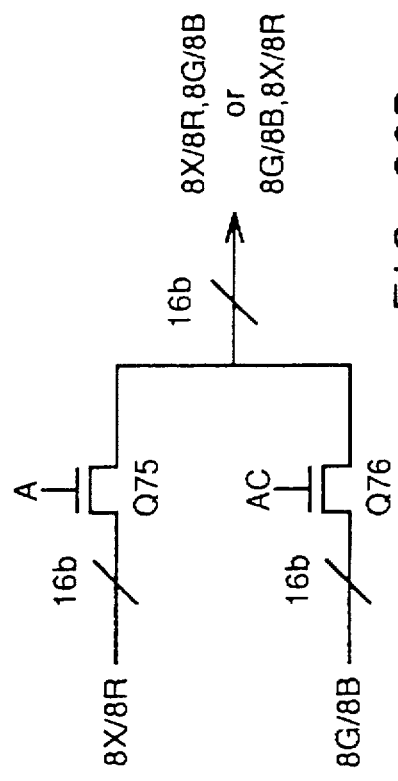
Figure 27:
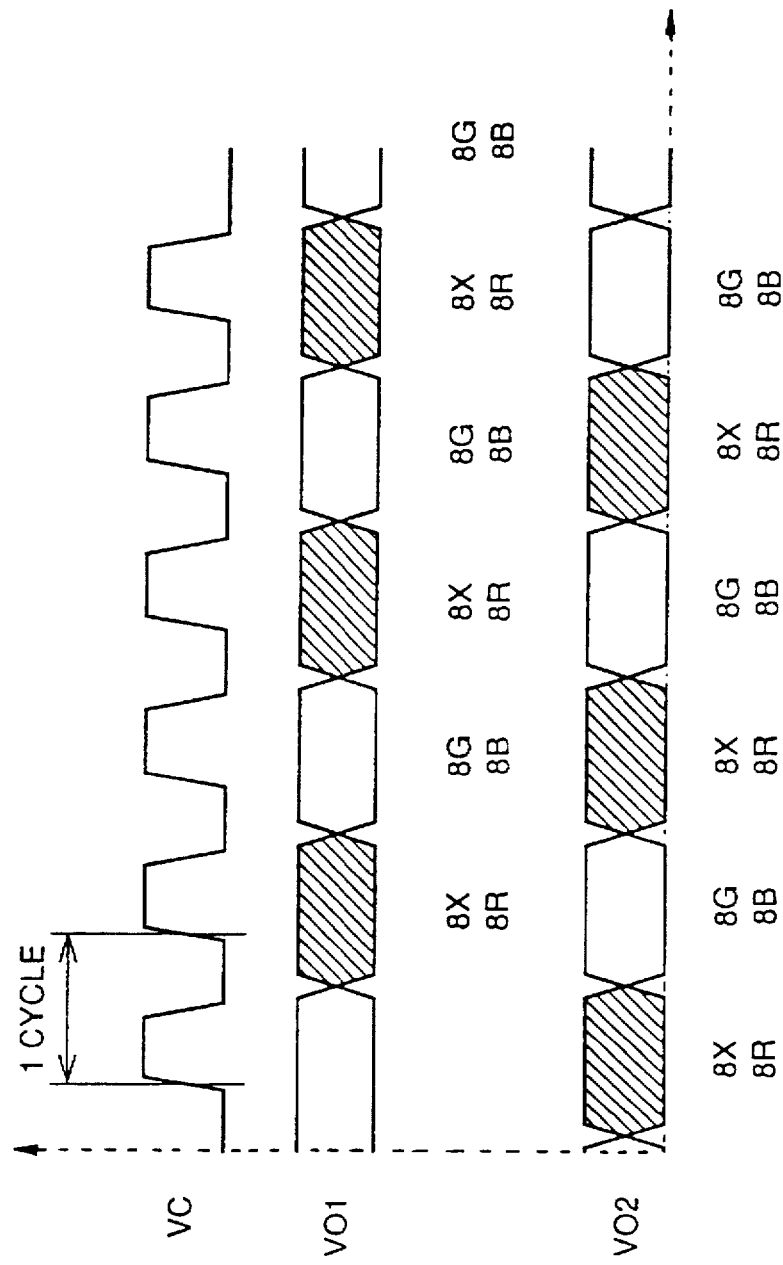
FIG. 27 is a timing chart showing output signals of a video output switching circuit shown in FIG. 26.

Video output circuit 7 shown in FIG. 1 will be more specifically described below. FIG. 25 is a block diagram showing a structure of the video output switching circuit shown in FIG. 1. FIG. 26 is a circuit diagram showing a specific structure of the video output switching circuit shown in FIG. 25, and FIG. 27 is a timing chart showing output signals of the video output switching circuit shown in FIG. 26.

Referring first to FIG. 25, the video output switching circuit includes an internal video clock generating circuit 71, an internal signal generating circuit 72, a selector 73, and registers R71 and R72. Internal video clock generating circuit 71 receives video clock signal VC from video clock signal input terminal VC, and outputs predetermined clock signal CK to registers R71 and R72. Register R71 receives, for example, X-data of 8 bits and R-data of 8 bits. Register R72 receives, for example, G-data of 8 bits and B-data of 8 bits. Registers R71 and R72 output the received data to selector 73. Internal video clock generating circuit 71 outputs a predetermined signal to internal signal generating circuit 72 in response to received video clock signal VC. Internal signal generating circuit 72 receives from a predetermined register in the device a control signal N/R instructing a normal mode or a reverse mode. Internal signal generating circuit 72 outputs the control signal N/R to selector 73 in response to the signal sent from internal video clock generating circuit 71. Selector 73 is responsive to control signal N/R to output the respective data sent from registers R71 and R72 without changing the order in the normal mode, and to output them in the switched order in the reverse mode.

The specific structure of the video output switching circuit shown in FIG. 25 will be described below. Referring to FIG.

26, the video output switching circuit includes NMOS transistors Q72–Q76, NOR gates G71 and G72, and inverters G73–G77.

Transistor Q71 is connected to NOR gate G71 and inverter G76, and receives video clock signal /VC (complementary to video clock signal VC) on its gate. Transistor Q72 is connected to NOR gates G71 and G72, and receives video clock signal VC on its gate. NOR gate G71 receives control signal N indicating the normal mode, and logical OR is carried out between the signal supplied via inverted transistor Q71 and control signal N. When the signal supplied from transistor Q71 and control signal N are "H", it outputs the signal of "L" to NOR gate G72. In the case other than the above, NOR gate G71 outputs the signal of "H" to NOR gate G72. NOR gate G72 receives the control signal R indicative of the reverse mode, and the logical sum of both the inverted signals is output to transistors Q72 and Q73.

Transistor Q73 is connected to inverter G73 and transistor Q74, and receives video clock signal VC on its gate. Transistor Q74 is connected to inverters G74–G76, and receives video signal /VC on its gate. Inverter G73 is connected to inverter G74. Inverter G75 outputs a control signal A for controlling transistor Q75. The output signal of inverter G75 is inverted by inverter G77 to form a control signal AC controlling transistor Q76. The output of inverter G76 is used as clock signal CK, and is sent to registers R71 and R72 shown in FIG. 25. The output of inverter G76 is returned to transistor Q71.

Transistor Q75 receives X-data of 8 bits and R-data of 8 bits. Transistor Q76 receives G-data of 8 bits and B-data of 8 bits.

According to the above structure, control signals A and AC are output in response to video clock signal VC and control signals N and R. In response to control signal A or AC thus output, transistors Q75 and Q76 are turned on or off, and R-data of 8 bits and G-data of 8 bits are output, or B-data of 8 bits and X-data of 8 bits are output.

The output signals of the aforementioned video output switching circuit will be described below. Referring to FIG. 27, when the normal mode is designated, X-data of 8 bits and R-data of 8 bits are first output by an output signal VO1 in response to video clock signal VC, and subsequently, G-data of 8 bits and B-data of 8 bits are output. Thereafter, the respective data will be output alternately, i.e., in the same manner. When the reverse mode is designated, G-data of 8 bits and B-data of 8 bits are output, as can be seen from an output signal VO2, and subsequently, X-data of 8 bits and R-data of 8 bits are output. Thereafter, the respective data will be output alternately. Accordingly, video output switching circuit 7 can switch the order of output data in response to control signals NIR, so that R-, G-, B- and X-data can be arbitrarily allocated to data bank memory 2, and thus flexibility in allocation of data can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit device for storing image data corresponding to a screen formed of a plurality of pixels arranged in N rows and M columns (N and M are integers larger than one) comprising:

a main memory storing said image data;

a cache memory storing a portion of said image data stored in said main memory;

a first data bus transferring said image data between said main memory and said cache memory;

a serial access memory storing said image data output from said main memory and outputting the stored image data onto said screen; and a second data bus transferring said image data from said main memory to said serial access memory, wherein said main memory activates a storage region storing said image data corresponding to the pixels in n rows and m columns on said screen (n and m are integers larger than one and satisfying relationships of n<N and m<M) in a first page mode for transferring said image data to/from said cache memory, and said main memory activates said storage region storing said image data corresponding to said pixels in one row and M columns on said screen in a second page mode for transferring said data to said serial access memory.

2. The semiconductor integrated circuit device according to claim 1, wherein said cache memory includes a plurality of memory blocks having a storage capacity of A bits, said first data bus has a bus width of A bits, and said main memory activates the storage region storing said image data of B bits (B=A■k, k is a positive integer) in said first page mode.

3. The semiconductor integrated circuit device according to claim 2, wherein each memory block has the storage capacity of 256 bits, and said first data bus has the bus width of 256 bits.

4. The semiconductor integrated circuit device according to claim 1, wherein said semiconductor integrated circuit device has four sides;

said semiconductor integrated circuit device further comprises an image data input terminal for inputting externally input image data into said device, and an image data output terminal for externally outputting said image data sent from said serial access memory;

said image data output terminal is disposed at one of said four sides; and said image data input terminal is disposed at a side other than said one side.

5. The semiconductor integrated circuit device according to claim 1, wherein said serial access memory includes first and second serial access memories;

the image data stored in said first serial access memory is different from the image data stored in said second serial access memory; and said semiconductor integrated circuit device further comprises output means for outputting alternately said image data output from said first serial access memory and said image data output from said second serial access memory in response to a predetermined clock signal, and control means for controlling said output means to change the order of output of said image data in response to a predetermined control signal.

6. The semiconductor integrated circuit device according to claim 1, further comprising:

write detecting means for detecting a memory cell in said cache memory on which writing is performed; and control means for controlling said cache memory to supply only said data of said memory cell of which writing is detected by said write detecting means to said main memory from said cache memory via said first data bus.

7. The semiconductor integrated circuit device according to claim 1, wherein said main memory stores the image data formed of at least one of a depth coordinate and color data;

said semiconductor integrated circuit device further comprises a comparison result signal output terminal for externally outputting a comparison result signal indicative of a result of comparison made between positions of said depth coordinate stored in said main memory and the newly input depth coordinate, when said main memory stores said depth coordinate, and a comparison result signal input terminal for internally inputting an externally input comparison result signal;

said main memory performs rewriting of the stored color data in accordance with said comparison result signal sent from said comparison result signal input terminal, when said main memory stores said color data; and said comparison result signal output terminal is disposed at a side opposite to said comparison result signal input terminal.

8. The semiconductor integrated circuit device according to claim 7, wherein said semiconductor integrated circuit device further comprises a clock signal input terminal for inputting a clock signal forming a reference of operation of said device; and said clock signal input terminal is disposed at the same side as said comparison result signal output terminal.

9. The semiconductor integrated circuit device according to claim 1, wherein said semiconductor integrated circuit device further comprises a clock signal input terminal for inputting a clock signal forming a reference of operation of said device;

said main memory performs rewriting of the stored image data in accordance with said comparison result signal; and said comparison result signal input terminal is disposed at a side opposite to said clock signal input terminal.

10. The semiconductor integrated circuit device according to claim 1, wherein a clock signal input terminal for inputting a clock signal forming a reference of operation of said device; and said comparison result signal output terminal is disposed at the same side as said clock signal input terminal.

11. The semiconductor integrated circuit device according to claim 1, wherein said main memory stores the image data formed of at least one of a depth coordinate and color data; and said semiconductor integrated circuit device further comprises comparing means for comparing positions of said depth coordinate stored in said main memory and the newly input depth coordinate and outputting a comparison result signal to the comparison result output terminal; and control means for controlling rewriting of said color data stored in said main memory in response to said comparison result signal sent from said comparison result signal input terminal, when said main memory stores said color data.

12. The semiconductor integrated circuit device according to claim 1, further comprising:

logical operation means for performing predetermined logical operation on said image data sent from said cache memory and the externally supplied image data; and storage region specifying means for storing again said image data processed by said logical operation means at an intended address in said cache memory.

13. The semiconductor integrated circuit device according to claim 1, further comprising:

write detecting means for detecting a memory cell in said cache memory on which writing is performed; and control means for controlling said cache memory to supply only the data of said memory cell of which writing is detected by said write detecting means to said main memory from said cache memory via said first data bus.

14. A semiconductor integrated circuit device for storing image data corresponding to a screen formed of a plurality of pixels arranged in N rows and M columns (N and M are integers larger than one) comprising:

a main memory storing said image data; said main memory including activating means for activating a first storage region of said main memory storing said image data corresponding to the pixels at a first region on said screen in a first page mode and activating a second storage region storing said image data corresponding to the pixels at a second region on said screen different in form from said first region in a second page mode different from said first page mode.

15. The semiconductor integrated circuit device according to claim 14, wherein said main memory further includes a plurality of memory cell arrays for storing the image data corresponding to a plurality of screen blocks formed by dividing said screen in the row and column directions;

said activating means includes a plurality of row sub-decoders provided correspondingly to each of said plurality of memory cell arrays, and a plurality of main row decoders provided for each of groups formed of said plurality of memory cell arrays and each including multiple memory cell arrays storing the image data corresponding to said screen blocks arranged in one row along the row direction; and said plurality of main row decoders and said plurality of row sub-decoders activate said first storage region of said plurality of memory cell arrays storing said image data corresponding to the pixels in n rows and m columns (n and m being integers larger than 1, and satisfying relationships of n<N and m<M) on said screen in said first page mode, and activate said second storage region of said plurality of memory cell arrays storing said image data corresponding to the pixels in one row and M columns on said screen in said second page mode.

16. The semiconductor integrated circuit device according to claim 15, wherein said main row decoder outputs an activation signal for activating said row sub-decoder in accordance with a predetermined control signal, and said row sub-decoder activates a predetermined row select line of the memory cell array corresponding to said row sub-decoder when said activation signal is input and an enable signal for activating said predetermined row select line is input.

17. A semiconductor integrated circuit device comprising:

a main memory storing image data;

a data bus transmitting said image data sent from said main memory;

a cache memory storing said image data transmitted through said data bus;

logical operation means for performing predetermined logical operation on said image data sent from said cache memory and the externally supplied image data; and address specifying means for storing again said image data processed by said logical operation means at an intended address in said cache memory, wherein said address specifying means includes a switching circuit outputting a predetermined switching signal, a selector selecting and outputting one of an address signal sent from an address input terminal and a write address signal sent from an image data input terminal in accordance with said switching signal, and a cache write decoder storing said image data at a predetermined address in accordance with an output signal of said selector.

18. The semiconductor integrated circuit device according to claim 17, wherein said logical operation means includes an image processing unit performing alpha-blending processing.

19. A semiconductor integrated circuit device comprising:

a main memory storing image data;

a data bus transmitting said image data sent from said main memory;

a cache memory storing image data transmitted through said data bus;

write detecting means for detecting a memory cell in said cache memory on which writing is performed; and control means for controlling said cache memory to supply only the data of said memory cell of which writing is detected by said write detecting means to said main memory from said cache memory via said data bus, wherein said cache memory includes a memory cell storing said image data, a write word line connected to said memory cell, and a read word line connected to said memory cell;

said write detecting means includes a memory cell for write detection connected to said write word line and said read word line;

the same data as the data in the memory cell of said cache memory is written into said memory cell for write detection;

said write detecting means further includes an AND gate provided for write detection and outputting a logical product between the data of said memory cell for write detection and a write enable signal; and said control means includes a write buffer outputting the data of the memory cell in said cache memory in accordance with the output of said AND gate for write detection.

20. The semiconductor integrated circuit device according to claim 19, wherein said write buffer outputs the data of the memory cell in said cache memory also in accordance with a plane signal instructing masking in a plane direction of said image data.

21. A semiconductor integrated circuit device comprising:

a first serial access memory storing first image data;

a second serial access memory storing second image data different from said first image data;

output means for outputting alternately the first image data output from said first serial access memory and the second image data output from said second serial access memory in response to a predetermined clock signal; and control means for controlling said output means to change the order of output of said first image data and said second image data in response to a predetermined control signal, wherein said control means includes an internal video clock generating circuit outputting a predetermined signal in response to a video clock signal, and an internal signal generating circuit outputting a mode control signal instructing one of a normal mode and a reverse mode in accordance with the signal supplied from said internal video clock generating circuit; and said output means includes a first register receiving the first image data supplied from said first serial access memory, a second register receiving the second image data supplied from said second serial access memory, and a selector selectively outputting the outputs of said first and second registers in accordance with said mode control signal.

22. An image data processing system comprising:

a plurality of semiconductor integrated circuit devices each having a storage capacity of A (Mbits) and outputting image data of C (bits) in a data transfer rate of B (nanoseconds); and output means for receiving image data supplied from at least four semiconductor integrated circuit devices among said plurality of semiconductor integrated circuit devices and outputting image data of 2C (bits) at a data transfer rate of B/2 (nanoseconds), wherein said output means includes first and second registers receiving the image data supplied from said plurality of semiconductor integrated circuit devices, a selector receiving the image data supplied from said first and second registers, and selectively outputting the received data, said plurality of semiconductor integrated circuit devices include four semiconductor integrated circuit devices, said A (Mbits) is 10 (Mbits), said B (nanoseconds) is 14 (nanoseconds), said C (bits) is 16 (bits), and the image data of 40 Mbits output from said output means corresponds to one plane of a screen.

23. An image data processing system comprising:

first and second semiconductor integrated circuit devices; and a clock generator outputting a predetermined system clock signal, wherein said first semiconductor integrated circuit device includes a first main memory storing a depth coordinate of image data, a comparison result signal output terminal for externally outputting a comparison result signal indicative of a result of comparison made between positions of said depth coordinate stored in said main memory and the newly input depth coordinate, and a first clock signal input terminal for inputting said system clock signal, said comparison result signal output terminal being disposed at the same side as said first clock signal input terminal;

said second semiconductor integrated circuit device includes a second main memory storing image data containing color data, a comparison result signal input terminal for internally inputting the comparison result signal sent from said first semiconductor integrated circuit device, and a second clock signal input terminal for inputting said system clock signal;

said second main memory performs rewriting of the stored color data in accordance with said comparison result signal;

said comparison result signal input terminal is disposed at a side opposite to said second clock signal input terminal;

said clock generator is disposed at a position relatively near to said first semiconductor integrated circuit device and relatively remote from said second semiconductor integrated circuit device;

said first semiconductor integrated circuit device includes a first register disposed near said comparison result signal output terminal, receiving the comparison result signal generated in said device, and outputting said comparison result signal to said comparison result signal output terminal in accordance with said system clock signal sent from said first clock signal input terminal; and said second semiconductor integrated circuit device includes a second register disposed near said comparison result signal input terminal, receiving the comparison result signal sent via said comparison result signal input terminal, and outputting said comparison result signal in accordance with said system clock signal sent from said second clock signal input terminal.

* * * * *